(12) United States Patent
Bierwerth et al.

(10) Patent No.: US 11,383,793 B2
(45) Date of Patent: Jul. 12, 2022

(54) CONTROL DEVICE FOR WIRELESSLY CONTROLLING AT LEAST ONE COMPONENT OF A BICYCLE

(71) Applicant: SRAM DEUTSCHLAND GmbH, Schweinfurt (DE)

(72) Inventors: Jochen Bierwerth, Arnstein (DE); Thorsten Hamisch, Kürnach (DE); Alexander Linke, Würzburg (DE); Mason Pluimer, Colorado Springs, CO (US); Sven Baumann, Grettstadt (DE); Wolfram Frank, Bamberg (DE); Chris Hilton, Wonfurt (DE)

(73) Assignee: SRAM Deutschland GmbH, Schweinfurt (DE)

( * ) Notice: Subject to any disclaimer, the term of this patent is extended or adjusted under 35 U.S.C. 154(b) by 0 days.

(21) Appl. No.: 17/337,059

(22) Filed: Jun. 2, 2021

(65) Prior Publication Data

US 2021/0284285 A1    Sep. 16, 2021

Related U.S. Application Data

(63) Continuation of application No. 16/553,621, filed on Aug. 28, 2019, now Pat. No. 11,052,970, which is a
(Continued)

(30) Foreign Application Priority Data

Sep. 22, 2015  (DE) ...................... 10 2015 218 173.1
Sep. 12, 2016  (DE) ...................... 10 2016 010 801.0

(51) Int. Cl.
*B62M 25/08*   (2006.01)
*B62K 21/26*   (2006.01)
(Continued)

(52) U.S. Cl.
CPC ............. *B62M 25/08* (2013.01); *B62K 21/26* (2013.01); *B62K 23/06* (2013.01); *B62M 9/122* (2013.01)

(58) Field of Classification Search
CPC ....... B62M 25/08; B62M 9/122; B62K 21/26; B62K 23/06
See application file for complete search history.

(56) References Cited

U.S. PATENT DOCUMENTS

| 8,402,664 B1 * | 3/2013 | Kitamura | ............... B62K 23/04 33/1 PT |
| 11,066,121 B1 * | 7/2021 | Snead | ................... B62K 23/06 |

(Continued)

*Primary Examiner* — David M Fenstermacher

(57) ABSTRACT

A control device for a bicycle is arranged or can be arranged on the handlebar of the bicycle and serves to wirelessly drive at least one electronic, electrical, electromechanical or electrohydraulic component of the bicycle. The control device includes an operator control arrangement which has at least one manually operable operator control element and is designed to respond to operation of the operator control element and to output electrical signals which represent the operation. The control device also includes at least one electronic circuit arrangement comprising a radio communication circuit and a control circuit which is connected or can be connected to the operator control arrangement. The control device also may include at least one antenna which is connected or can be connected to the radio communication circuit or which is integrated into the said communication circuit.

16 Claims, 27 Drawing Sheets

Related U.S. Application Data continuation of application No. 15/272,593, filed on Sep. 22, 2016, now Pat. No. 10,421,521.

(51) Int. Cl.
*B62K 23/06* (2006.01)
*B62M 9/122* (2010.01)

(56) References Cited

U.S. PATENT DOCUMENTS

| | | | |
|---|---|---|---|
| 2004/0200307 A1* | 10/2004 | Mitchell | B62M 25/08 74/502.2 |
| 2013/0004818 A1* | 1/2013 | Honda | B62J 43/20 429/98 |
| 2013/0014607 A1* | 1/2013 | Miki | B62K 23/06 74/501.6 |
| 2017/0369125 A1* | 12/2017 | Katsura | B62M 6/55 |
| 2019/0002053 A1* | 1/2019 | Kakinoki | B62K 19/40 |
| 2020/0039608 A1* | 2/2020 | Komada | B62M 6/45 |
| 2020/0262512 A1* | 8/2020 | Hahn | B62M 9/122 |
| 2020/0354010 A1* | 11/2020 | Hsieh | B62K 23/06 |
| 2020/0377167 A1* | 12/2020 | Suzuki | B62M 6/45 |

* cited by examiner

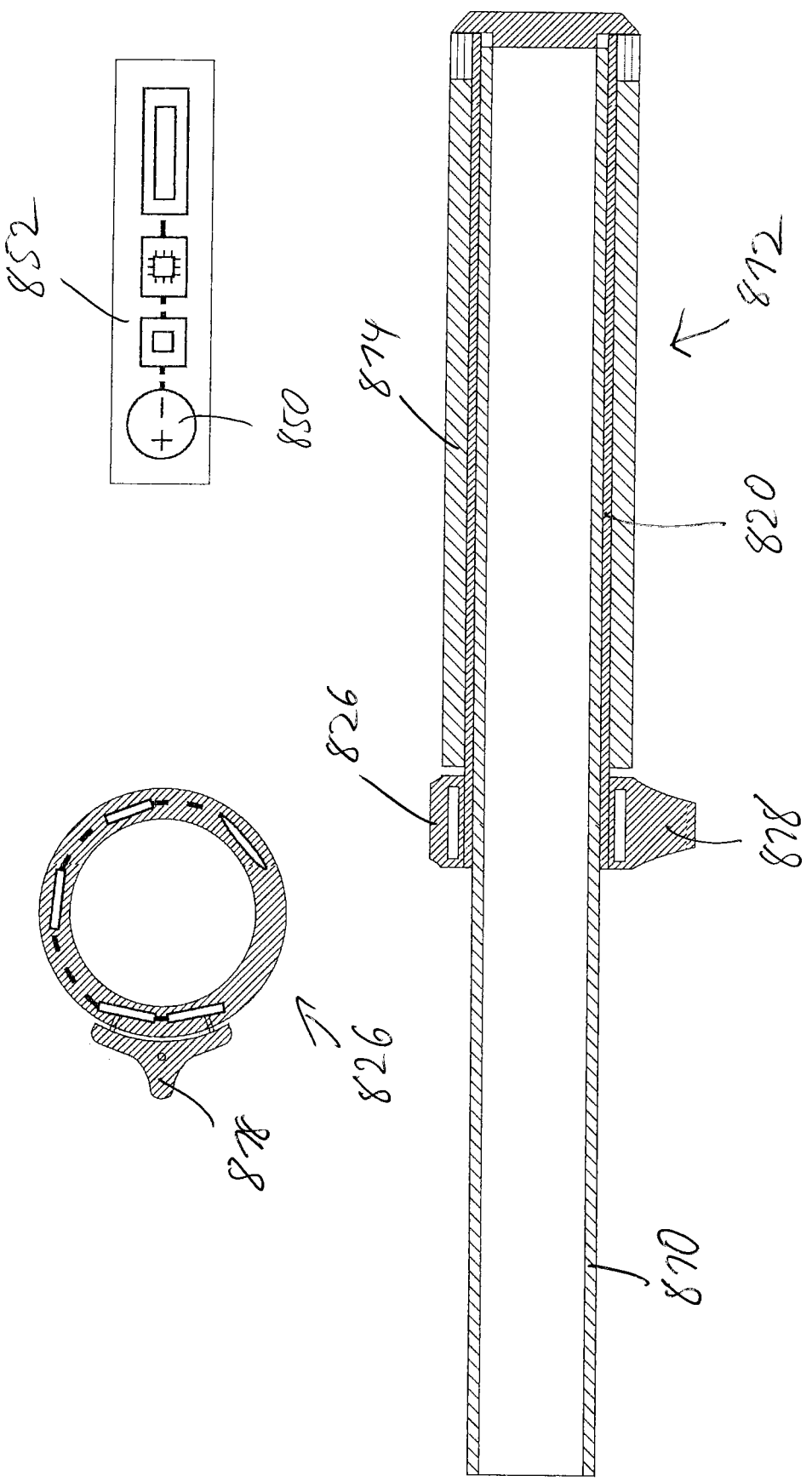

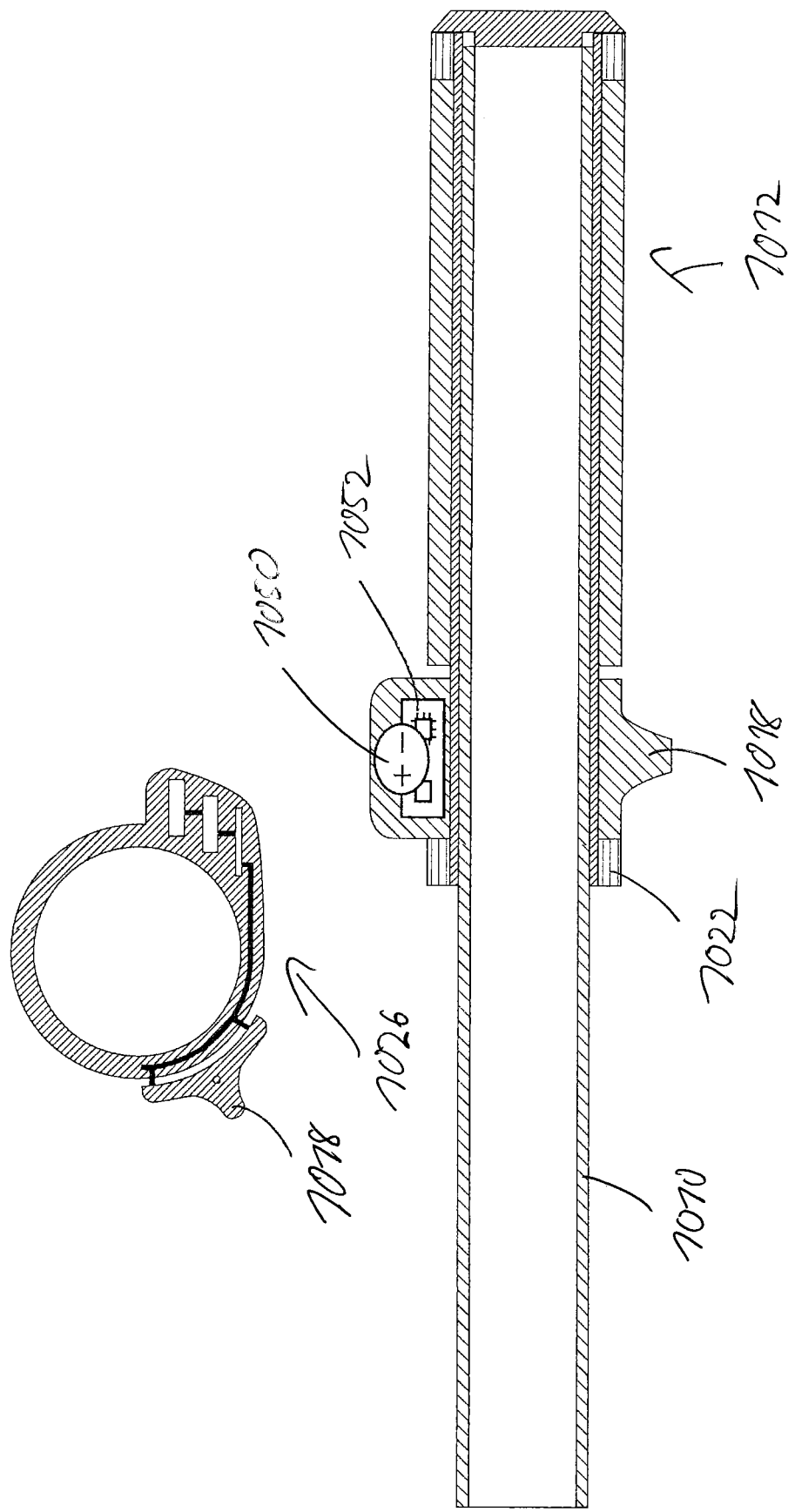

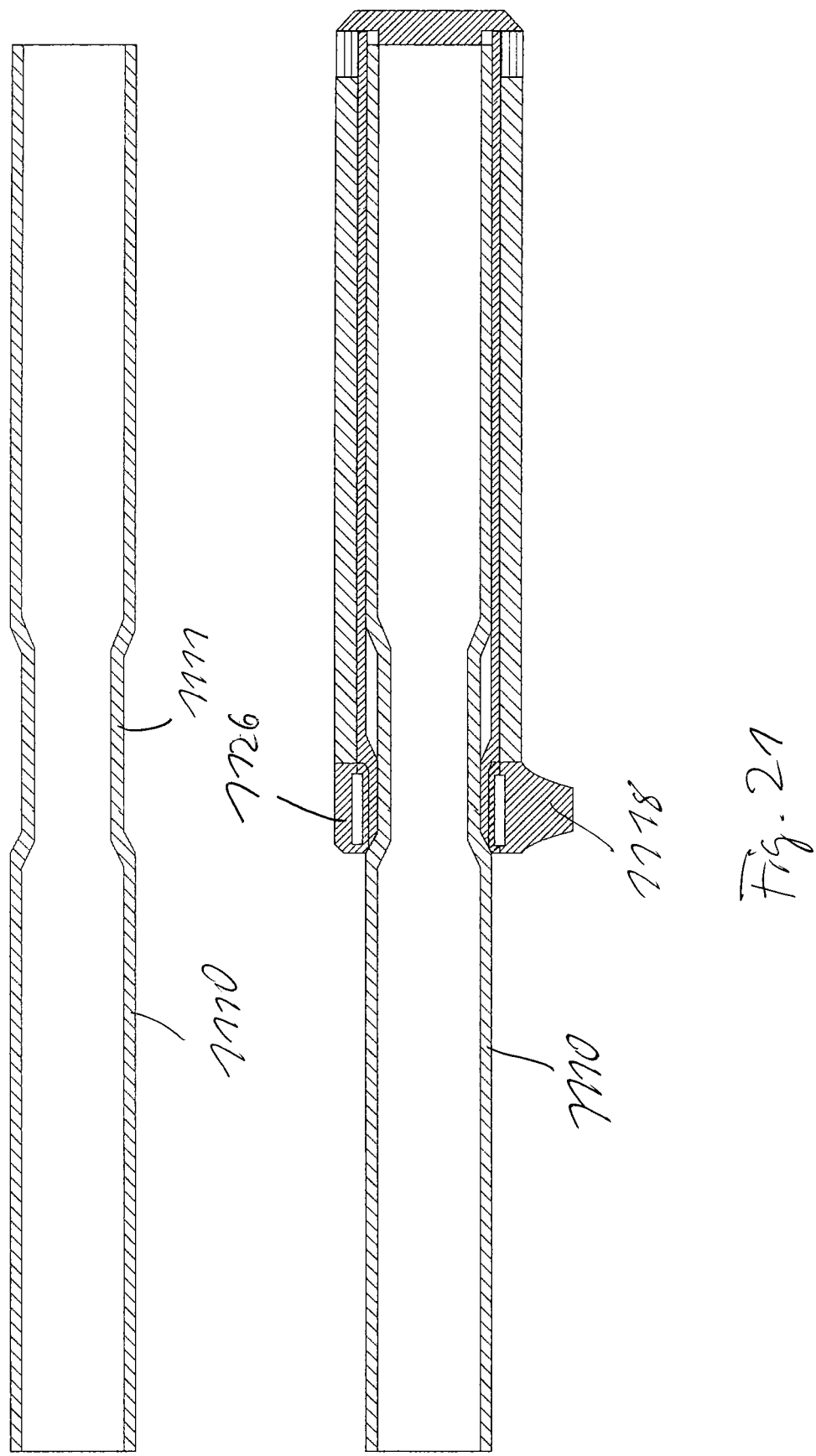

CONTROL DEVICE FOR WIRELESSLY CONTROLLING AT LEAST ONE COMPONENT OF A BICYCLE

This application is a continuation of U.S. patent application Ser. No. 16/553,621, filed Aug. 28, 2019, which is a continuation of U.S. patent application Ser. No. 15/272,593, filed Sep. 22, 2016, now U.S. Pat. No. 10,421,521 which claims priority to, and/or the benefit of, German patent application DE 10 2015 218 173.1, filed on Sep. 22, 2015 and German patent application DE 10 2016 010 801.0, filed on Sep. 12, 2016.

FIELD OF THE INVENTION

The invention generally relates to a control device for a bicycle, and specifically to a control device that is arranged, or configured to be arranged, on a handlebar of a bicycle and serves to wirelessly control at least one electronic, electrical, electromechanical, or electrohydraulic component of the bicycle.

BACKGROUND

An electromechanical shift system is known from EP 2 719 616 A2 or DE 10 2013 016 777 A1 and can operate in accordance with the methods and protocols disclosed in these publications. Examples of a shifting mechanism which can be controlled, in principle, by a control device or operating apparatus are provided by DE 10 2013 017 154 A1, which describes a front shifting mechanism, and DE 10 2013 015 946 A1, which describes a rear shifting mechanism.

Given the background of this prior art, it is the object of the present invention to provide a control device for at least one bicycle component as is described herein.

SUMMARY AND DESCRIPTION

In an embodiment, a control device is arranged or can be arranged on a handlebar of the bicycle and serves to wirelessly drive at least one electronic, electrical, electromechanical or electrohydraulic component of the bicycle. The control device includes an operator control arrangement which has at least one manually operable operator control element and is designed to respond to operation of the operator control element in a first and a second direction and to output electrical signals which represent the operations, the operator control element configured to be operated with less force in the first direction than the second direction to output the electrical signals. The control device also includes at least one electronic circuit arrangement comprising a radio communication circuit, a control circuit which is connected or can be connected to the operator control arrangement, and at least one antenna which is connected or can be connected to the radio communication circuit or which is integrated into the said communication circuit. The control circuit is designed to transmit wireless control commands to the at least one electronic, electrical, electromechanical or electrohydraulic component of the bicycle or to a command unit which is connected or can be connected to the said component by cable or in a wireless manner by the radio communication circuit and the antenna on the basis of electrical signals which are received by the operator control arrangement.

BRIEF DESCRIPTION OF THE DRAWINGS

FIG. 6a shows an exploded illustration according to FIG. 5. FIG. 6b shows the electronics unit and operator control unit in the state in which they are plugged together and inserted into the handlebar tube, without an associated handlebar grip.

FIGS. 7-13 schematically show further design variants.

FIGS. 18-23 show further design variants and exemplary embodiments.

DETAILED DESCRIPTION OF THE DRAWINGS

Figure 1:
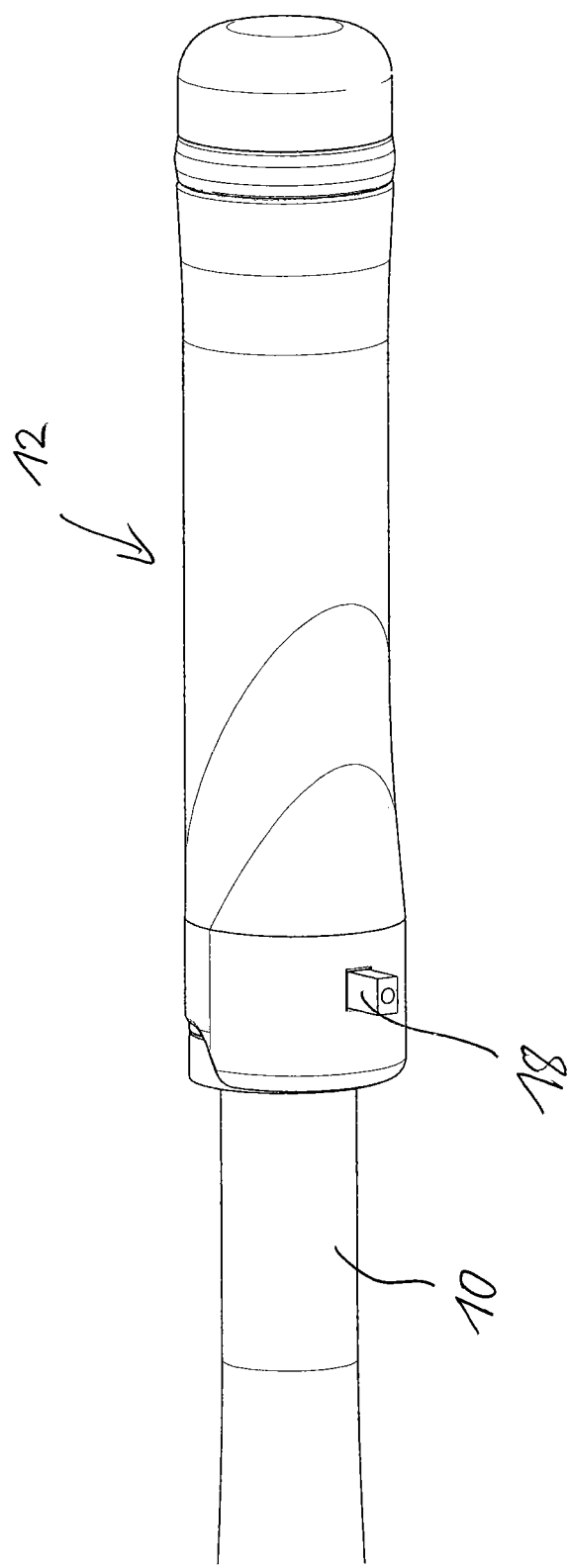
FIG. 1 shows an example of a control device according to an embodiment which comprises a grip unit which is arranged on a bicycle handlebar.

A control device with a radio communication circuit has the advantageous effect over the conventional wired transmission of control commands that it is possible to dispense with laying transmission lines for electrical signal transmission. This results in considerably greater freedom for arranging the control device on the handlebar. Connection cables, which could be damaged, can be dispensed with and the vehicle frame does not need to have any fittings for laying connection cables, for example in tube interiors.

The text which follows is concerned with design options for a control device according to an embodiment which each may independently have inventive character.

According to a first refinement, it is provided that the electronic circuit arrangement which is arranged concentrated in one spatial region or extends along a non-linear line of extension has a printed circuit board arrangement, comprising at least one printed circuit board which is of flexible design at least in regions or a plurality of printed circuit boards which are connected by means of flexible conductors. The concentrated arrangement of the electronic circuit arrangement in a spatial region and also the electronic circuit arrangement, which extends along a line of extension and is arranged distributed along the line of extension to a certain extent, enable a space-saving arrangement of the control device on or in a bicycle handlebar. An attractive appearance to the cyclist or potential cyclists or purchasers and good ergonomics for the cyclist can also be achieved in this way. In this context, it can expediently be provided that the electronic circuit arrangement is arranged or can be arranged at least partially adjacent to one end of the handlebar.

The general idea is that the control device comprises a plurality of units which are connected or can be connected to one another. Specifically, the control device according to an embodiment can be distinguished by a plurality of units which are connected or can be connected in a wireless manner or by means of a cable arrangement and each are arranged or can be arranged as a separate component on or in the handlebar.

According to a first variant, the control device comprises an operator control unit which has the operator control arrangement, a control unit which has at least the control circuit and, if desired, the radio communication circuit, and an antenna unit which has the antenna.

According to a second variant, the control device comprises an operator control unit which has the operator control arrangement, and a control unit which has the control circuit, the radio communication circuit and the antenna.

According to a third variant, the control device comprises a first unit which has the operator control arrangement and the control circuit, and a second unit which has the antenna, wherein the first or the second unit also has the radio communication circuit.

According to a fourth variant, the control device comprises an operator control unit which has the operator control arrangement and the antenna, and a control unit which has the control circuit, wherein the operator control unit or the control unit also has the radio communication circuit.

As a development, it is proposed that a grip unit is designed such that it is integrated with the operator control unit or/and with the antenna unit, wherein the operator control unit may be provided in a region of the grip unit which is closer to the centre of the handlebar, and the antenna unit may be provided outside a grip region of the grip unit by way of which grip region a cyclist is intended to grasp the grip unit. A/the grip unit can advantageously designed with an integrated cable arrangement or with a guide for a separate cable arrangement for connecting a plurality of the components mentioned.

Overall, this results in a large number of degrees of freedom for the bicycle component developer in respect of specific refinements in order to meet design-related, ergonomic and other requirements.

As an alternative, the control device can be distinguished by a unit which has the operator control arrangement, the control circuit, the radio communication circuit and the antenna and forms a component which is arranged or can be arranged on or in the handlebar. In this case, the control device can advantageously have a fastener or fastening means for fastening the unit to a grip unit, and in an embodiment to an end of the grip unit which is remote from the centre of the handlebar.

Particular embodiments and design variants are distinguished by one or more of the features mentioned in the text which follows.

According to one first design approach, it is provided that the electronic circuit arrangement is accommodated or can be accommodated at least partially within a hollow section of the handlebar. According to a second design approach, it is provided that the electronic circuit arrangement is arranged or can be arranged such that it extends at least partially around an outer circumference of the handlebar at least in regions.

It is also possible to combine the two design approaches. Therefore, it is also proposed that the electronic circuit arrangement is accommodated or can be accommodated at least partially within a hollow section of the handlebar and is arranged or can be arranged such that it extends at least partially around an outer circumference of the handlebar at least in regions.

As a development, it is proposed in this context that the or at least one antenna is accommodated in the hollow section of the handlebar or projects out of the hollow section of the handlebar at one end of the handlebar, or is arranged adjacent to this end. This proposal makes particular sense in connection with the first design approach.

Owing to the at least partial arrangement of the electronic circuit arrangement or the antenna in the hollow section of the handlebar or, in general, a hollow component of the bicycle, possibly also a section of the bicycle frame, for example the head tube (also called steerer tube or steering tube), installation space which is conventionally unused is used for accommodating the said important functional components. This component is well protected against environmental influences in the hollow section of the handlebar (or frame) and the need to provide any receptacles on the outside of the handlebar is accordingly avoided. Therefore, in general, hollow components and regions of the bicycle or frame are taken into consideration for accommodating the relevant components, in particular electronic components. Hollow components of this kind are, for example, hollow sections in the handlebar, in the handlebar stem, in the handlebar attachment for example for triathlon bicycles, in the fork stem and also—as already stated—in the bicycle frame in general.

Primarily (but not exclusively) in connection with the second design approach, the or at least one antenna may be arranged or can be arranged on an outer side of the handlebar such that it is offset in relation to a grip of the handlebar in the direction of the centre of the handlebar. For the second design approach, it is further proposed that the printed circuit board which is of flexible design at least in regions or the printed circuit boards which are connected by means of flexible conductors extend or can be arranged so as to extend around the outer circumference of the handlebar at least in regions. The available installation space is therefore used efficiently.

The general idea is that the antenna is supported by a/the printed circuit board arrangement of the electronic circuit arrangement, wherein the printed circuit board arrangement is accommodated or can be accommodated at least partially within a hollow section of the handlebar or is arranged or can be arranged such that it extends around an outer circumference of the handlebar at least in regions. A housing which accommodates the electronic circuit arrangement and, if desired, the antenna and is inserted or can be inserted into the hollow section of the handlebar at least in regions, or is mounted or can be mounted on the outer circumference of the handlebar, can be provided.

As regards accommodating the housing at least partially in the hollow section of the handlebar as is the object of the first design approach, the idea is that the housing is accommodated or can be accommodated entirely in the hollow section of the handlebar, or has an inner housing section which is accommodated or can be accommodated in the hollow section of the handlebar, and has an outer housing section which projects beyond one end of the handlebar, wherein the outer housing section may have a larger outside diameter than the inner housing section.

In as much as an outer housing section which projects beyond one end of the handlebar is provided, the said outer housing section can be equipped with a protective cap, so that this outer housing section is protected against impacts, for example as a result of the parked bicycle tipping over or a crash during cycling. Instead of a protective cap which fulfils only a protective function, an operator control unit which may be designed as a protective cap and at least partially covers the outer housing section can be provided, the said operator control unit forming the operator control arrangement and having, for example, an operator control button as operator control element. An operator control unit of this kind at the end of the handlebar can also come into consideration when the housing is accommodated entirely in the hollow section of the handlebar.

With regards to designing the housing to be mounted on the outer circumference of the handlebar as is the object of the second design approach, it is proposed, as a development, that the housing has an annular or sleeve-like housing section which extends around the handlebar.

The housing can expediently have a receptacle for at least one replaceable battery by way of which electrical energy can be supplied to the electronic circuit arrangement. The battery may also be a rechargeable battery. The receptacle may be accessible by opening a housing closure or by disconnecting a plurality of separate housing sections. Two housing half-shells which are put together or can be put together to form the housing are considered to be particularly expedient in this context.

An embodiment having a plurality of units which are connected to one another is distinguished in that the control unit has the housing and is connected or can be connected to the separate operator control unit or/and to the separate antenna unit by means of at least one plug connector arrangement. In this case, it can advantageously be provided that the control unit is connected or can be connected to the operator control unit by means of the plug connector arrangement and a cable arrangement which is guided through a/the grip unit.

According to an advantageous alternative refinement, it is provided that the operator control unit is inserted or can be inserted into a receptacle in the control unit or/and into an end section of the hollow handlebar so as to establish the connection of the operator control unit to the control unit by means of the plug connector arrangement.

According to a further advantageous possibility, it is provided that the operator control unit is integrated into a/the grip unit or is arranged or can be arranged on the handlebar adjacent to the grip unit in the direction of the centre of the handlebar, and the control unit is connected or can be connected to the operator control arrangement by means of the plug connector arrangement and a cable arrangement which is guided through the grip unit.

The general idea is that the operator control unit or a/the grip unit has the antenna, or that a/the grip unit, which is separate from the control unit and the operator control unit, has the antenna.

A further embodiment according to the second design approach is distinguished in that the electronic circuit arrangement or the printed circuit board arrangement thereof extends over a circumferential angle of at least 180 degrees, preferably of at least 240 degrees, extremely preferably of at least 300 degrees, around the outer circumference of the handlebar. According to the second design approach, it can further advantageously be provided that the housing has the at least one operator control element in a first circumferential angle region, and has the receptacle for the at least one battery in a second circumferential angle region which is offset in relation to the first circumferential angle region.

It is also possible within the scope of the invention that the control device comprises a housing which is held on the outside of the handlebar and which contains the electronic circuit arrangement and the antenna. A fastening apparatus which fixes the housing on the handlebar, and in an embodiment surrounds the handlebar in an annular manner, can be used expediently in this case. The housing can project laterally from the fastening apparatus in the direction of the centre of the handlebar. A particular refinement is distinguished in that the fastening apparatus has the operator control arrangement.

Without restricting the general nature, the invention also provides the following subjects:

1. An operating apparatus for a bicycle, for electrically and, in particular, wirelessly operating components which are associated with the bicycle, in particular shifting components, spring components and the like, wherein the operating apparatus has:
    a radio means for transmitting and/or receiving radio waves;
    an operating means, in particular a switch, which is connected to the radio means by means of an electrical conductor, for operating the radio means; and
    an antenna which is connected to the radio means,
    characterized in that the antenna is arranged within a hollow section of a handlebar, which is arranged on the bicycle, at least in sections.

2. Operating apparatus according to Subject 1, characterized in that the antenna is arranged entirely within the hollow section of the handlebar.

3. Operating apparatus according to either of the preceding subjects, characterized in that the antenna is electrically insulated from the handlebar tube.

4. Operating apparatus according to one of the preceding subjects, characterized in that the radio means is arranged within the hollow section of the handlebar at least in sections.

5. Operating apparatus according to one of Subjects 1 to 3, characterized in that the radio means is arranged entirely within the hollow section of the handlebar.

6. Operating apparatus according to one of the preceding subjects, characterized in that the antenna is in the form of an antenna from the group comprising flat antennas, group antennas, linear antennas, magnetic antennas or reflector antennas.

7. Operating apparatus according to one of the preceding subjects, characterized in that the antenna is in the form of a chip antenna which is connected to the radio means, wherein the chip antenna may be arranged together with the radio means on a common printed circuit board.

8. Operating apparatus according to one of the preceding subjects, characterized in that the antenna is in the form of a wire antenna which extends approximately along ⅛ of the width of the handlebar, preferably approximately along ¼ of the width of the handlebar, more preferably approximately along ½ of the width of the handlebar, and particularly preferably approximately along the entire width of the handlebar.

9. Operating apparatus according to one of the preceding claims, characterized in that the radio means operates in a UHF (Ultra High Frequency) frequency band, preferably in the range of between approximately 0.3 GHz and 3 GHz and particularly preferably in the range of between approximately 2.4 GHz and 2.5 GHz, or in that the radio means operates in an SHF (Super High Frequency) frequency band in the range of between approximately 3 GHz and 30 GHz, preferably in the range of between approximately 3.4 GHz and 3.6 GHz, more preferably in the range of between approximately 5 GHz and 6 GHz and particularly preferably in the range of between approximately 5.7 GHz and 5.9 GHz.

10. Operating apparatus according to one of the preceding subjects, characterized in that a first section of the electrical conductor is arranged outside the handlebar, and a second section of the electrical conductor is arranged within the handlebar.

11. Operating apparatus according to one of the preceding subjects, characterized in that a second operating means is provided, and the second operating means is electrically connected to a radio module by means of a second electrical conductor, wherein a first section of the second electrical conductor is arranged outside the handlebar, and a second section of the second electrical conductor is arranged within the handlebar.

12. Operating apparatus according to Subject 11, characterized in that the first electrical conductor, which is connected to the first operating means, is connected to a first radio means, and the second electrical conductor, which is connected to the second operating means, is connected to a second radio means.

13. Operating apparatus according to Subject 11, characterized in that the first electrical conductor, which is connected to the first operating means, and the second electrical conductor, which is connected to the second operating means, are connected to the same radio means.

14. Operating apparatus according to one of Subjects 10 to 13, characterized in that a protection apparatus for protecting against mechanical damage to the electrical conductor is provided at the junction between the first and the second section of the electrical conductor.

15. Operating apparatus according to one of the preceding subjects, characterized in that the electrical conductor forms the antenna.

16. Operating apparatus according to one of the preceding subjects, characterized in that the operating apparatus further has a grip, wherein the operating means is arranged on the grip, and in particular is integrally formed on the grip at least in sections.

17. Operating apparatus according to one of the preceding subjects, characterized in that the antenna has a centre axis which runs at a defined angle ($\alpha$) in relation to the centre axis of the handlebar, wherein this angle ($\alpha$) is preferably approximately 45°, more preferably approximately 60° to 75°, and particularly preferably approximately 90°.

18. Operating apparatus according to one of the preceding subjects, characterized in that the antenna has a centre axis which runs in a skewed manner in relation to the centre axis of the handlebar.

19. Operating apparatus according to one of Subjects 1 to 18, characterized in that the antenna has a centre axis which runs approximately parallel, and in an embodiment approximately coaxially, in relation to the centre axis of the handlebar.

20. Operating apparatus according to one of Subjects 1 to 19, characterized in that the antenna has a winding, in particular a helical winding, wherein the outside diameter of the winding corresponds approximately to the inside diameter of the hollow section of the handlebar.

21. Operating apparatus according to one of the preceding subjects, characterized in that the electrical conductor is routed through a bore which is provided in the handlebar.

22. Operating apparatus according to one of the preceding subjects, characterized in that the handlebar has a first electrical contact point, and the grip has a second electrical contact point, wherein the two contact points are arranged relative to one another in such a way that, when the grip is pushed onto the handlebar approximately over the entire circumference, the two contact points come into electrically conductive contact with one another at least in sections.

23. Operating apparatus according to one of the preceding subjects, characterized in that a first contact point, which is provided on the handlebar, is connected to the radio means by means of an electrical conductor, in particular by means of a ribbon cable.

24. Operating apparatus according to one of the preceding subjects, characterized in that the operating means is arranged on the handle at least in sections and can be moved in a rotary and/or translatory manner.

25. Operating apparatus according to one of the preceding subjects, characterized in that the radio module has a power supply which is arranged within the hollow section of the handlebar at least in sections.

26. Bicycle having an operating apparatus according to one of the preceding subjects.

The inventive operating apparatus according to these subjects can be part of a control device according to an embodiment or can form said control device.

A control device or operating apparatus of this kind can be part of an electromechanical shift system of the kind known from EP 2 719 616 A2 or DE 10 2013 016 777 A1 and can operate in accordance with the methods and protocols disclosed in these publications. Specifically, the control device or operating apparatus according to an embodiment can serve as a left-hand side or right-hand side shift unit ("left shift unit", "right shift unit") according to the disclosure of EP 2 719 616 A2 and accordingly be designed to control shifting states of at least one electromechanical gear shifting device or to shift between different gears, for example of a front electromechanical derailleur and a rear electromechanical derailleur of an electromechanical derailleur system of a bicycle.

Examples of a shifting mechanism which can be controlled, in principle, by a control device or operating apparatus according to an embodiment are provided by DE 10 2013 017 154 A1, which describes a front shifting mechanism, and DE 10 2013 015 946 A1, which describes a rear shifting mechanism. A front shifting mechanism of this kind and a rear shifting mechanism of this kind can be paired with a control device according to an embodiment by means of the radio communication circuit in order to couple the control device to a specific shifting mechanism. By way of example, the electronic circuit arrangement of the control device and an electronic circuit arrangement of the shifting mechanism can each be designed with a pairing operating element in order to assign the control device and the shifting mechanism to one another.

It can be provided that the control device and the shifting mechanism and also—if provided—possibly an interposed command unit are designed for bidirectional wireless signal transmission, so that the respectively driven component can report back confirmation signals or the like.

In as much as the concern here is that the control device is arranged or can be arranged on or in a handlebar of a bicycle, and in as much as reference is made to a hollow section of the handlebar or the outer circumference of the handlebar or an end of the handlebar, it should be noted that the term "handlebar" is intended to be understood very generally. The said term is primarily intended to mean that bicycle component which can also be called a hand holder and is connected to the fork of the bicycle and is rotatably mounted together with the said fork and serves to control the bicycle (primarily when travelling slowly) and is customary in various forms, for example as a so-called standard handlebar, MTB handlebar, racing handlebar, time trial handlebar, BMX handlebar, trick handlebar, bicycle polo handlebar, bullhorn handlebar and combination handlebar. Reference is made to the corresponding key words and handlebar sub-types, some of which have been mentioned above, in the technical book "Smolik, Etzel: Das große Fahrradlexikon; Technik, Praxis, Material von A bis Z" [The Big Bicycle Encyclopaedia; Engineering, Practice, Material from A to Z], 1997, Bielefelder Verlagsanstalt GmbH & Co KG, first edition. However, the term "handlebar" is also intended to cover so-called "handlebar adapters" and "handlebar attachments", specifically, for example, extensions or attachments, which are screwed or clamped to the actual handlebar, for increasing the number of grip options for the cyclist and for allowing special positions. Examples include so-called "bar ends" and so-called "triathlon handlebars" or "tri-bracket" (tri handlebar).

Finally, the fork stem (also called fork stem tube), which is accommodated in the head tube of the frame, and the front stem, which connects the handlebar to the fork stem, together with associated components such as front stem cap and clip, are also intended to be covered by the term "handlebar".

In spite of this very general understanding of the term "handlebar" which forms the basis here, the handlebar in the narrower sense and the handlebar adapter and handlebar attachments mentioned, which serve as hand holders and for supporting a portion of the cyclist's weight by way of his hands and/or arms and are used in various refinements, are primarily considered in connection with preferred embodiments and/or refinements of the control device according to an embodiment, however. Without restricting the general nature, reference is made to handlebars and handlebar adapters and/or handlebar attachments which are disclosed in U.S. Pat. No. 7,207,237 B2, DE 20 2013 004 765 U1, EP 2 703 275 A2, EP 2 253 531 B1 and EP 1 582 452 B1.

As regards a front stem which is wholly suitable for arranging a control device according to an embodiment or at least a portion of said control device, reference is made to US 2010/0127030 A1, without restricting the general nature.

The invention and the design approaches and design options mentioned above will be explained below with reference to a plurality of exemplary embodiments, with reference to the appended figures.

A first exemplary embodiment of a control device according to an embodiment for a bicycle is illustrated in various views in FIGS. 1 to 5. The said figures show a handlebar 10 which is equipped with a grip 12 according to FIG. 1, in the present case with the right-hand side grip from the view of the cyclist riding the bicycle.

Figure 2:
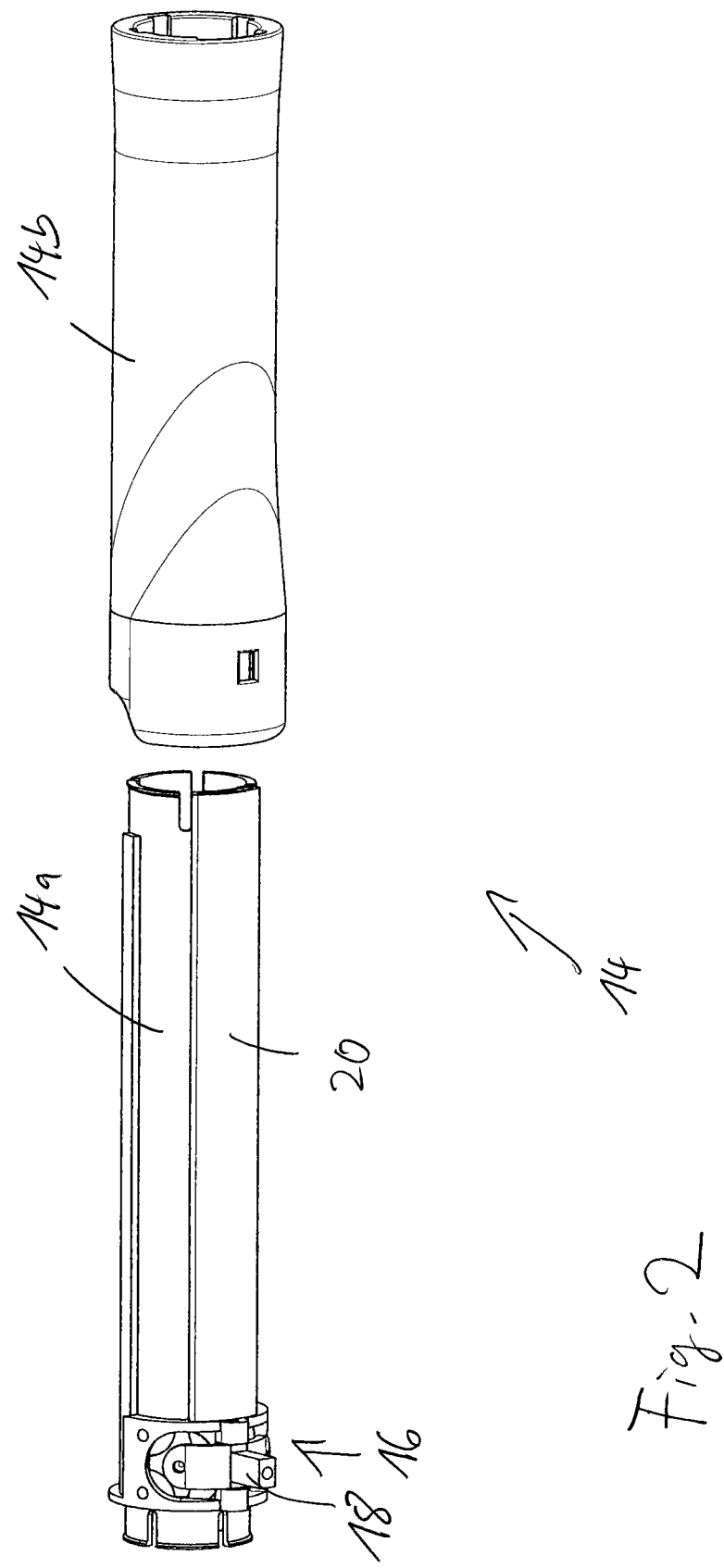
FIG. 2 shows the grip unit in the form of an exploded illustration, with a sleeve-like holder element which is to be fitted to the handlebar and has an integrated operator control lever and a sleeve-like rubber grip element which is illustrated separately and is seated on the outer circumference of the holder element according to FIG. 1.

An important constituent part of the grip 12 is a grip unit 14, illustrated in FIG. 2, which is formed by a sleeve-like holder element 14a and a sleeve-like rubber grip element 14b which is supported on the outside by this holder element.

The sleeve-like holder element 14a is equipped with an electrical operator control arrangement 16, here an operator control lever arrangement 16, in its end region which is remote from the handlebar end, the said operator control lever arrangement having an operator control lever 18 which can be pivoted in the circumferential direction and with which the cyclist can transmit control commands to an electronic, electrical, electromechanical or electrohydraulic component of the bicycle, for example to an electromechanical derailleur system of the bicycle. The operator control lever 18 can also be configured differently, for example with a free end which satisfies ergonomic requirements and on which, for example, the cyclist can act using his thumbs in order to operate the operator control lever 18 in opposite operating directions. In addition or as an alternative, the lever could also be pivotable in other directions. As an alternative, pushbutton operator control could be provided.

A sleeve body 20 of the sleeve-like holder element 14a, which sleeve body is still to be equipped with the electrical operator control lever arrangement, can be produced with the rubber grip element 14b by coextrusion, in a deviation from the two-part configuration shown in FIG. 2.

Figure 3:
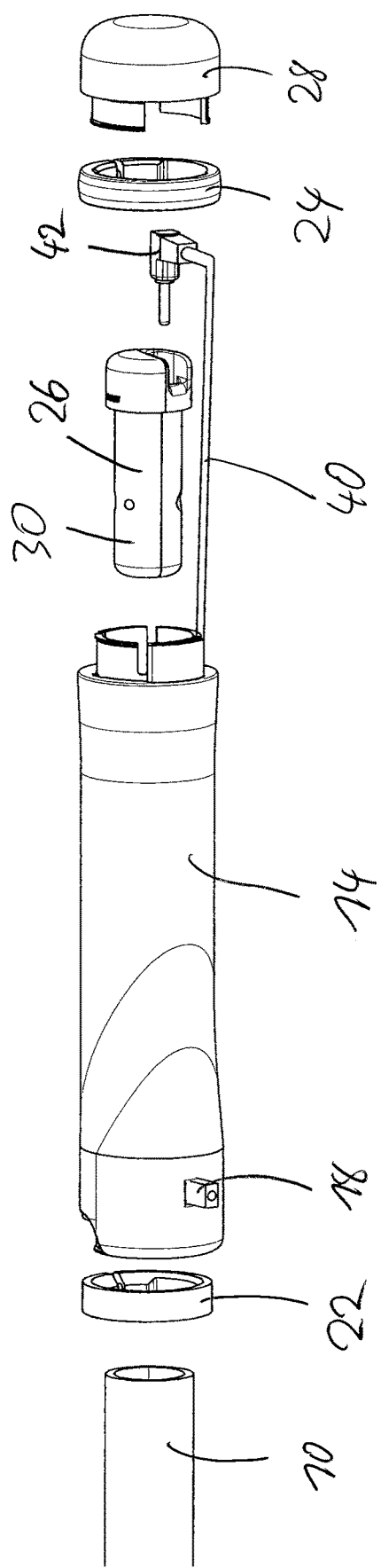
FIG. 3 shows the handlebar in the form of an exploded illustration, with a clamping ring, the grip unit which is formed from the holder element and the rubber grip element, an associated electronics unit which is to be at least partially accommodated in the interior of the handlebar, a further clamping ring and a covering cap which form the arrangement according to FIG. 1 in the finally assembled state.

FIG. 3 shows an exploded illustration of the arrangement according to FIG. 1. Said figure shows two clamping rings 22 and 24 which secure the grip unit 14 to the handlebar, and an electronics unit 26 which is to be inserted into the interior of the handlebar, and a covering cap 28 which is secured to an end region of the sleeve-like holder element 14a, which end region is associated with the handlebar end, by the clamping ring 24.

Figure 4:
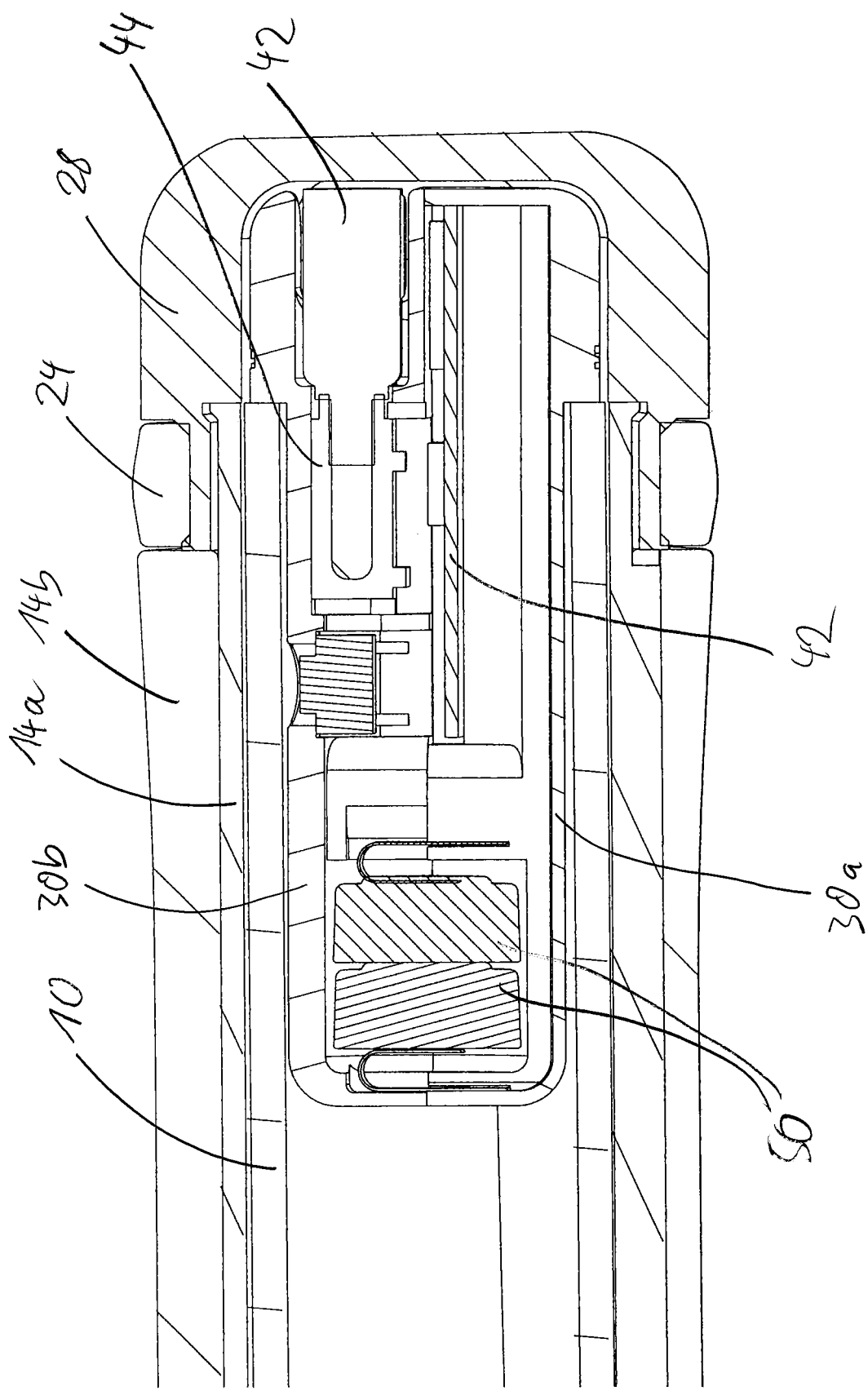
FIG. 4 is a cross-sectional view of the arrangement according to FIG. 1.
Figure 5:
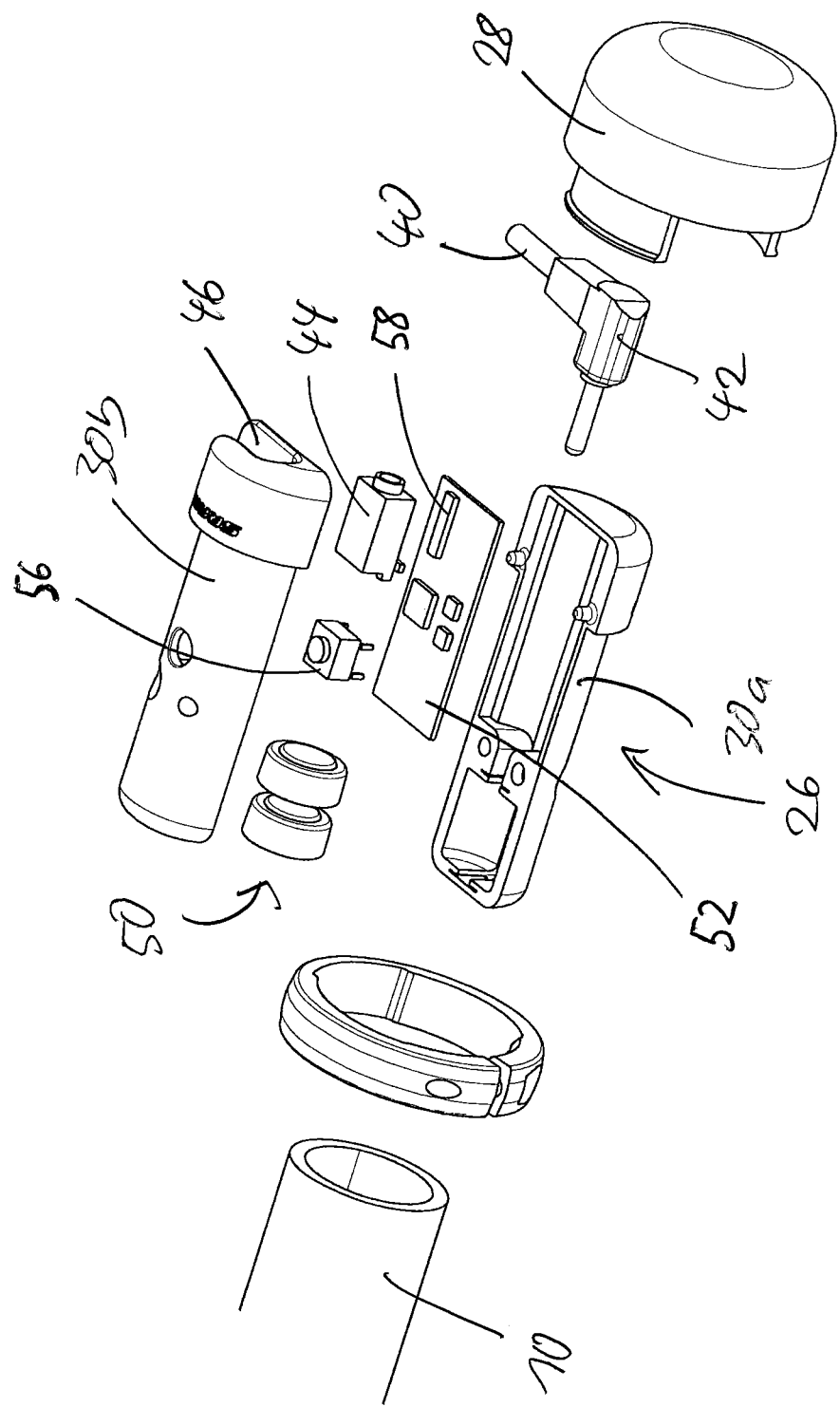
FIG. 5 shows the arrangement according to FIG. 3 without the grip unit, with an exploded illustration of the electronics unit.

As shown in the sectional view of FIG. 4, the electronics unit 26 projects out of the end of the handlebar tube 10 by way of a section of larger diameter and is covered and protected by the covering cap 28. The electronics unit 26 has a housing 30 comprising two half-shells 30a and 30b which accommodate an electronic circuit arrangement comprising a radio communication circuit and an antenna. Reference is additionally made to FIG. 5 in this respect.

The electrical operator control lever arrangement 16 is connected to the electronics unit 26 by means of an electrical connection cable 40 which is routed through a cable guide of the sleeve-like holder element 14a and ends in an electrical plug connector 42. To this end, the electrical plug connector 42 is inserted into an electrical plug connector receptacle 44 in the interior of the housing 30, for which reason the housing is designed with an insertion opening 46 in the end region of larger diameter.

Components of the electronics unit 26 are an electrical power supply which is formed by an energy source 50, in the case of the example by two batteries or button cells 50, a printed circuit board 52 which supports the electronic circuit arrangement comprising the radio communication circuit and the antenna, together with the electrical plug connector receptacle 44 and a "pairing" pushbutton 56 which serves for mutual assignment in the sense of so-called "pairing" of the control device and the associated electronic, electrical, electromechanical or electrohydraulic component of the bicycle. In FIG. 5, the antenna is identified by 58. As is clear from FIG. 5 in conjunction with FIG. 4, the antenna is arranged in the end region, which is arranged outside the handlebar, of enlarged diameter of the electronics unit for a good radio communication connection to the component of the bicycle which is to be driven. To this end, the covering cap 28 is produced from a material which is highly permeable to radio waves, for example a plastic material.

The electronics unit 26 can also be used without the grip unit 14, for example in combination with an operator control unit 60 which is independent of the grip, can be designed with an integrated plug connector 62 and can be inserted into the insertion opening 46 immediately from the outside in order to establish the electrical connection with the plug connector receptacle 44, this resulting in the arrangement shown in FIG. 6b. The individual components are shown in FIG. 6a in an illustration which corresponds to FIG. 5. An operator control element 64, for example an operator control button 64, is provided at the free end of the operator control unit 60, it being possible for control commands for the electronic, electrical, electromechanical or electrohydraulic component of the bicycle, which component is to be driven, to be transmitted by way of the said operator control element.

Figure 6:
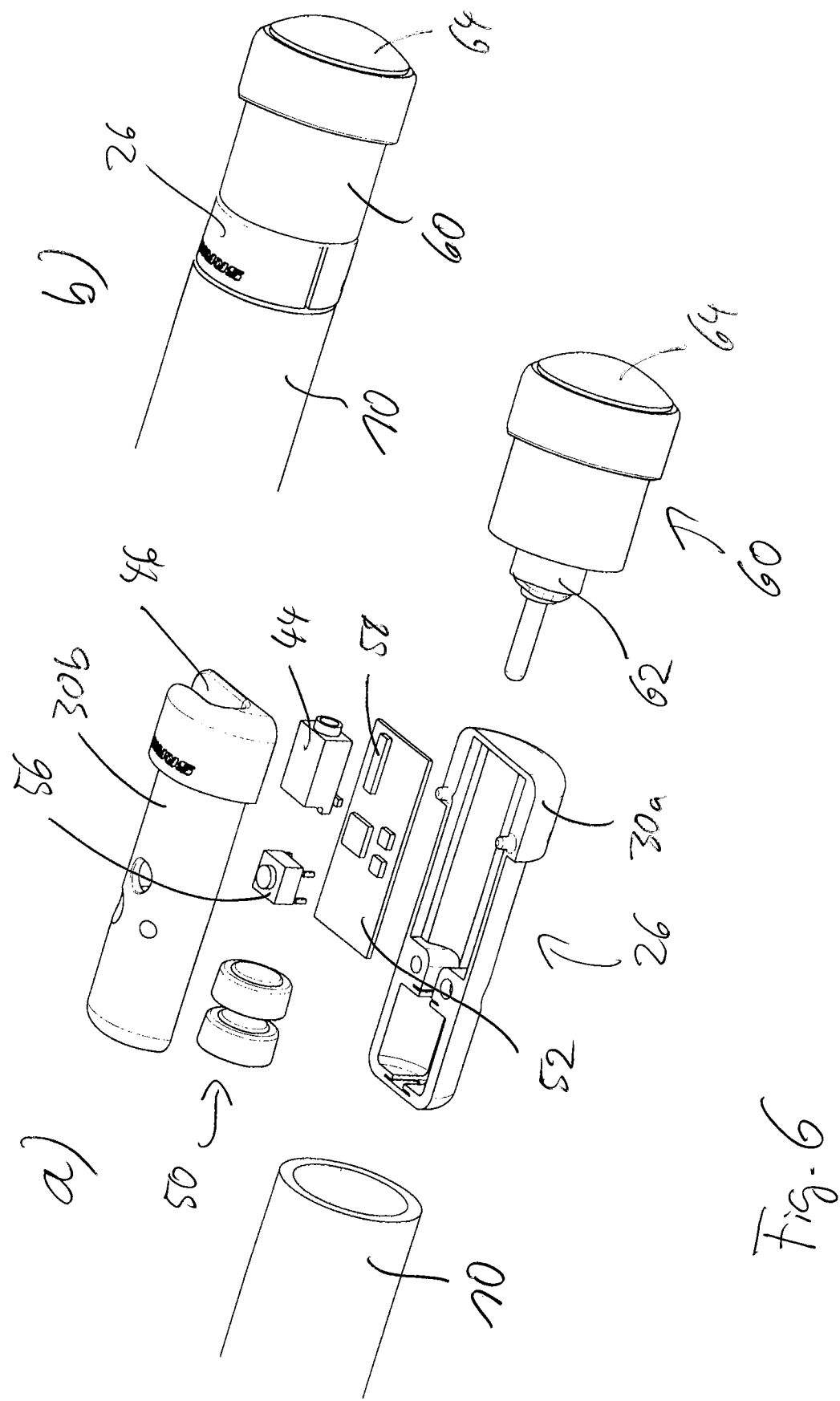
FIG. 6 shows, in subfigures 6a and 6b, an alternative control device according to an embodiment which uses the same electronics unit in connection with a normal handlebar grip and a separate operator control unit on the end of the handlebar.

The arrangement according to FIG. 6 is frequently further provided with a handlebar grip which then may cover not only the end region of the handlebar 10 but also the section of enlarged diameter of the electronics unit 26 and the adjacent section of identical diameter of the operator control unit 60.

FIGS. 7 to 13 schematically show further exemplary embodiments and design variants. The same reference symbols as in FIGS. 1 to 6 are used in each case, respectively increased by 100, and only the differences from the exemplary embodiment already described above or the exemplary embodiments already described above or the special features are explained in each case.

Figure 7:
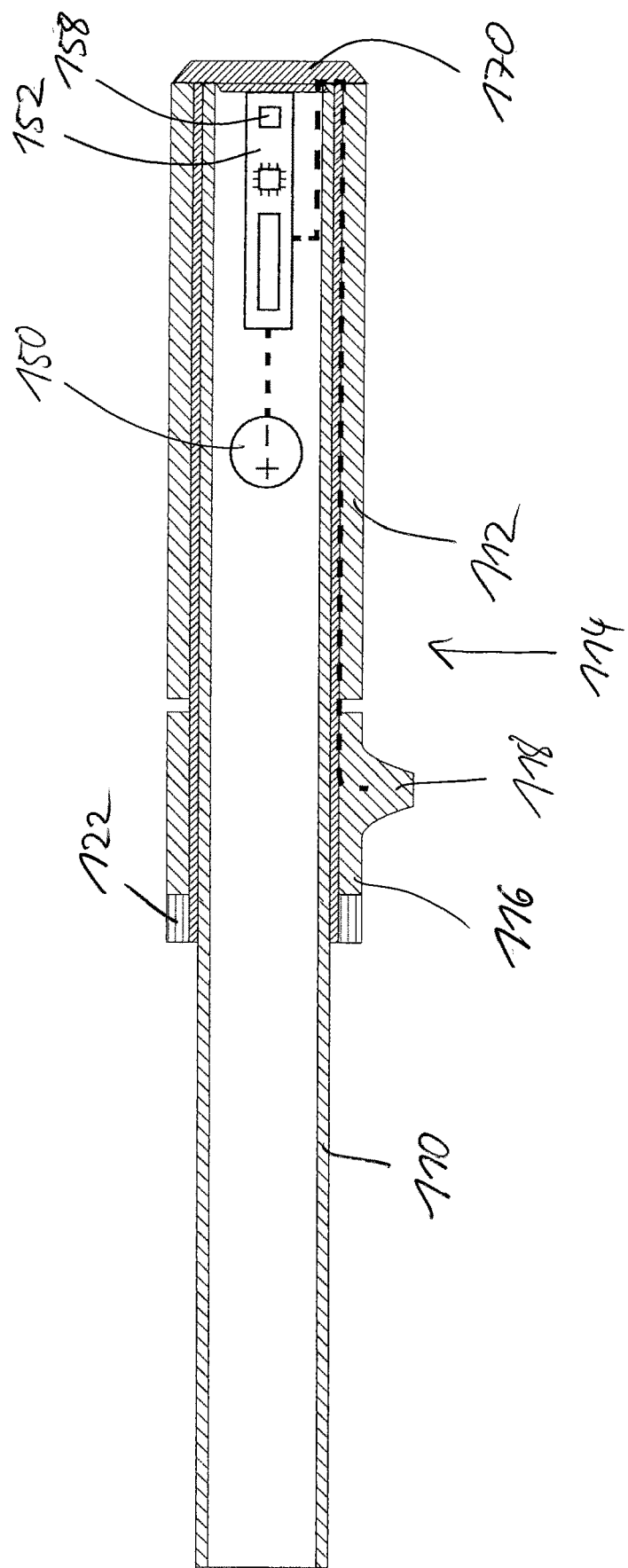

According to the variant shown in FIG. 7, the electronics unit, represented by its printed circuit board 152 and a battery 150, is accommodated entirely in the interior of the hollow handlebar 110 in the end region of the said handlebar. The hollow space is closed off to the outside by a cover cap 170. Electrical connections, firstly between the printed circuit board 152 and the battery 150 and secondly between the printed circuit board 152 and an operator control arrangement 116, here an operator control lever arrangement 116 of the handlebar grip 112 comprising an operator control lever 118, are illustrated in dashed lines. The printed circuit board 152 supports an electronic control circuit comprising a radio communication circuit and an antenna 158.

Figure 8:
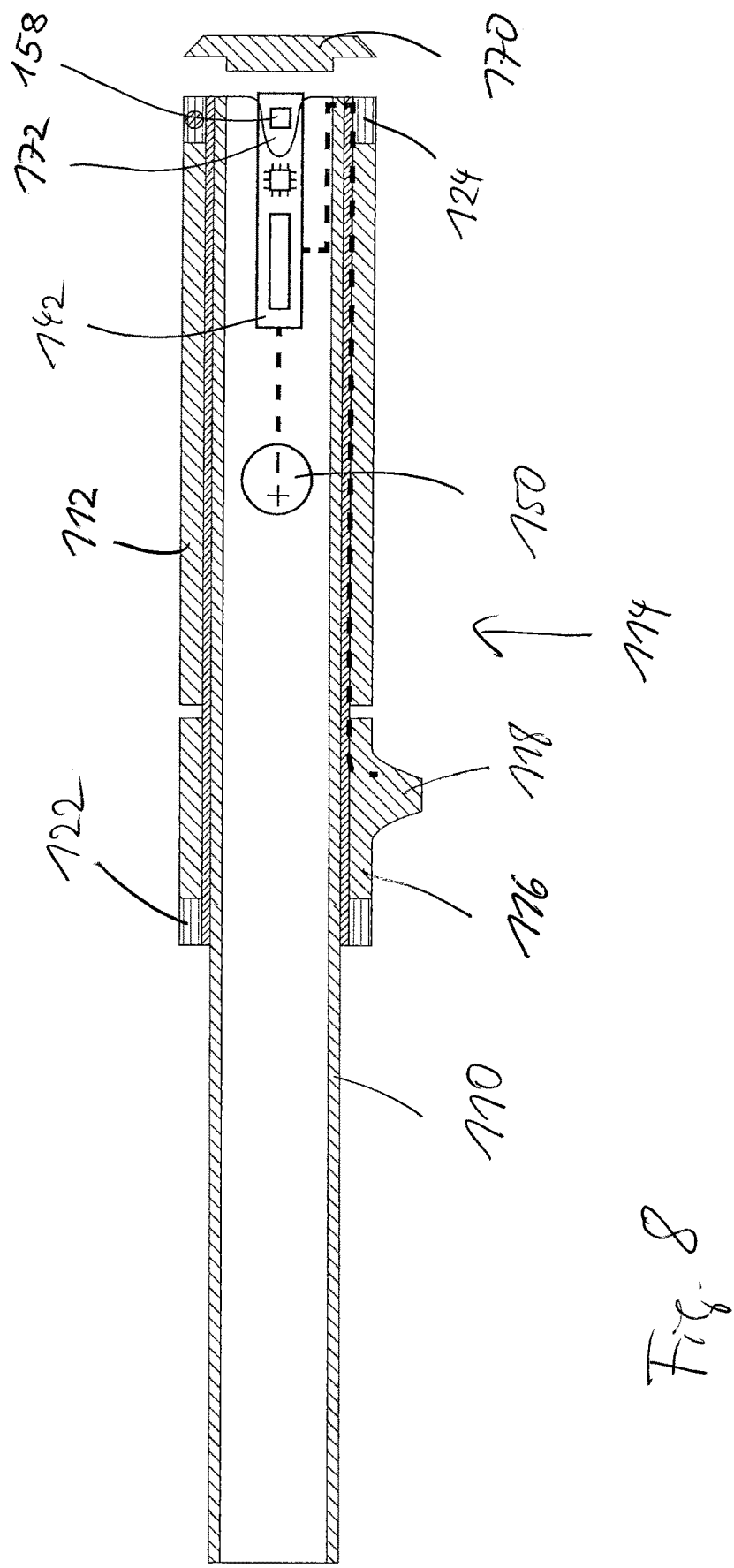

The connection line from the printed circuit board 152 to the operator control lever arrangement 116 is routed out of the handlebar tube and through a cable guide arrangement, which is integrated into the grip, to the operator control lever arrangement 116. As illustrated in FIG. 8, the handlebar 110 can be designed with a radially open cut-out 172 in its end region for the purpose of improved exit of radio waves from the handlebar tube and—in the case of a bidirectional radio connection—for improved entry of radio waves into the interior of the handlebar. However, given a sufficient transmission power, the radio coupling by means of the open end of the handlebar tube is sufficient, for which purpose the cover cap 170 should of course be produced from a material which is permeable to radio waves.

FIG. 8 also differs from FIG. 7 in that a clamping ring 124 which secures the grip unit 114 to the handlebar is illustrated. Therefore, the arrangements according to FIG. 7 and FIG. 8 can be designed such that the electronics unit is an integral constituent part of a handlebar end covering which replaces or encloses the cover cap.

Figure 9:
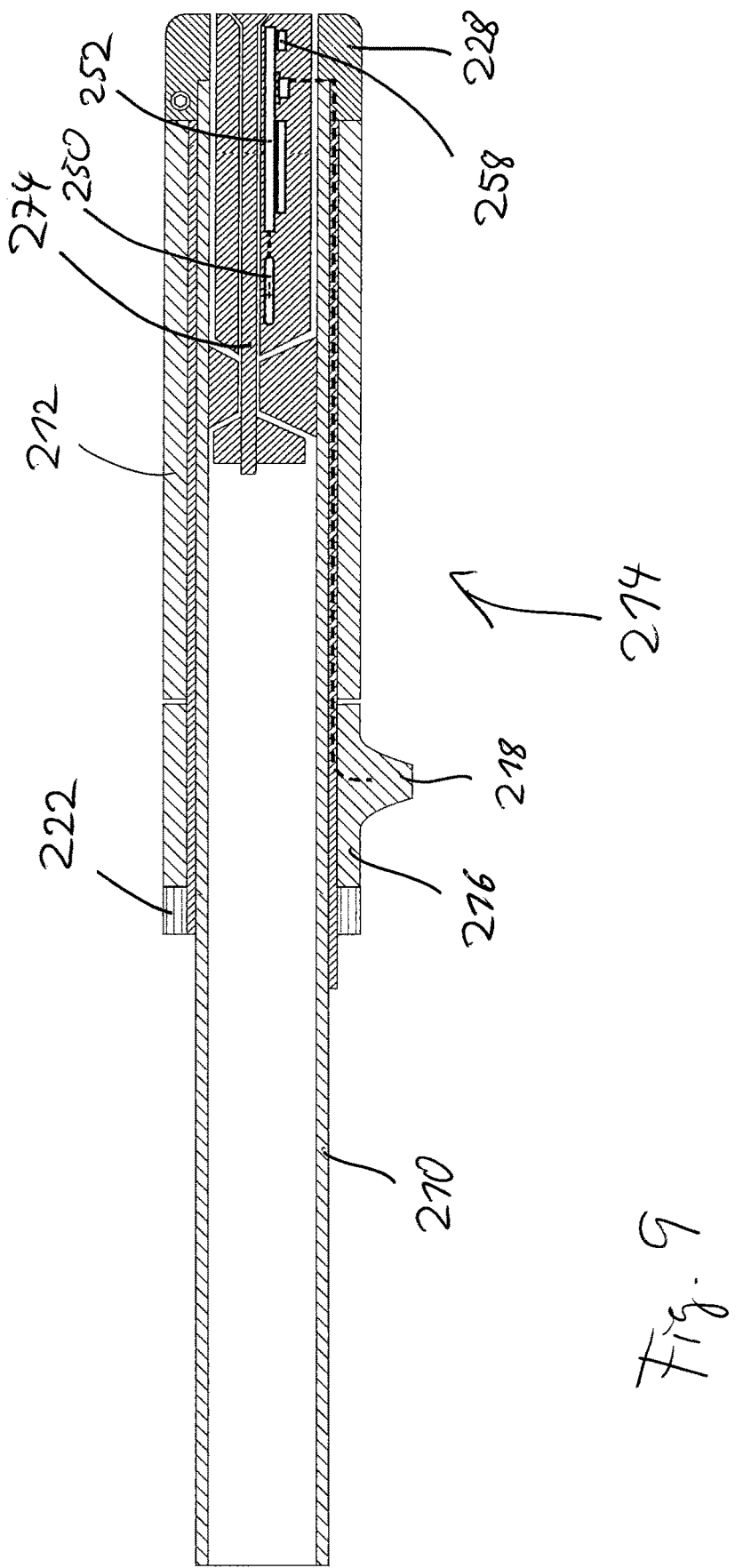

FIG. 9 shows a design variant in which the electronics unit is held in the interior of the handlebar by means of a special holder arrangement 274. The antenna is arranged outside the handlebar. In this region, the electronics unit is protected by a covering 228.

The arrangement according to FIG. 9 can also be designed such that the electronics unit is an integral constituent part of a handlebar end covering which encloses the covering 228.

Figure 10:
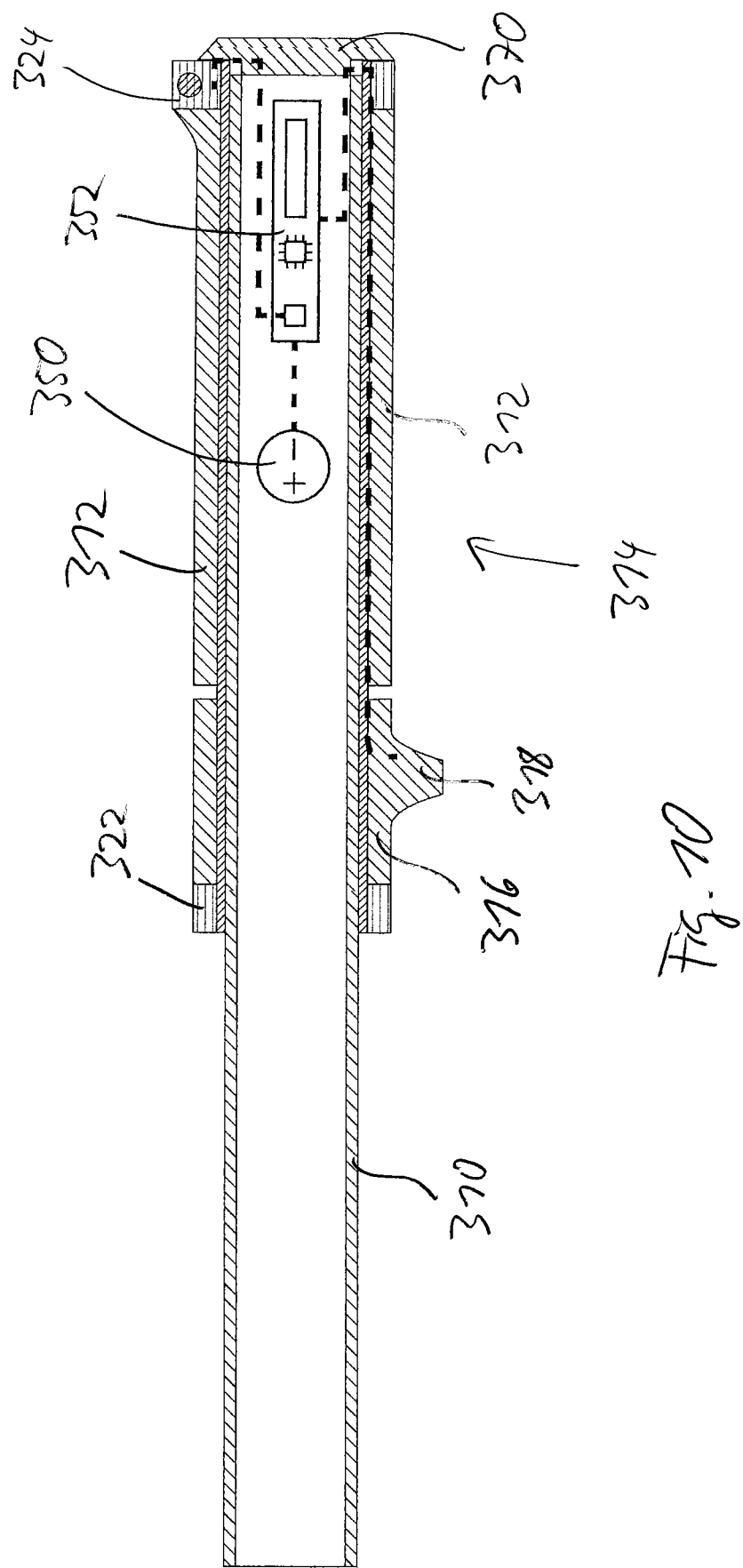

The design variant according to FIG. 10 differs from the solution according to FIG. 7 or FIG. 8 in that the electronics unit which is accommodated in the interior of the handlebar does not have an antenna on the printed circuit board 352, but rather is connected to an antenna which is arranged externally in the region of the clamping ring 324 by means of a connection line illustrated in dashed lines. To this end, the clamping ring is produced from a material which is permeable to radio waves. The antenna could also be provided at a different location, in particular integrated into the grip unit 314.

The electronics unit can advantageously be an integral constituent part of a handlebar end cover which could enclose a section which corresponds to the cover cap 370 and the associated electronics unit.

Figure 11:
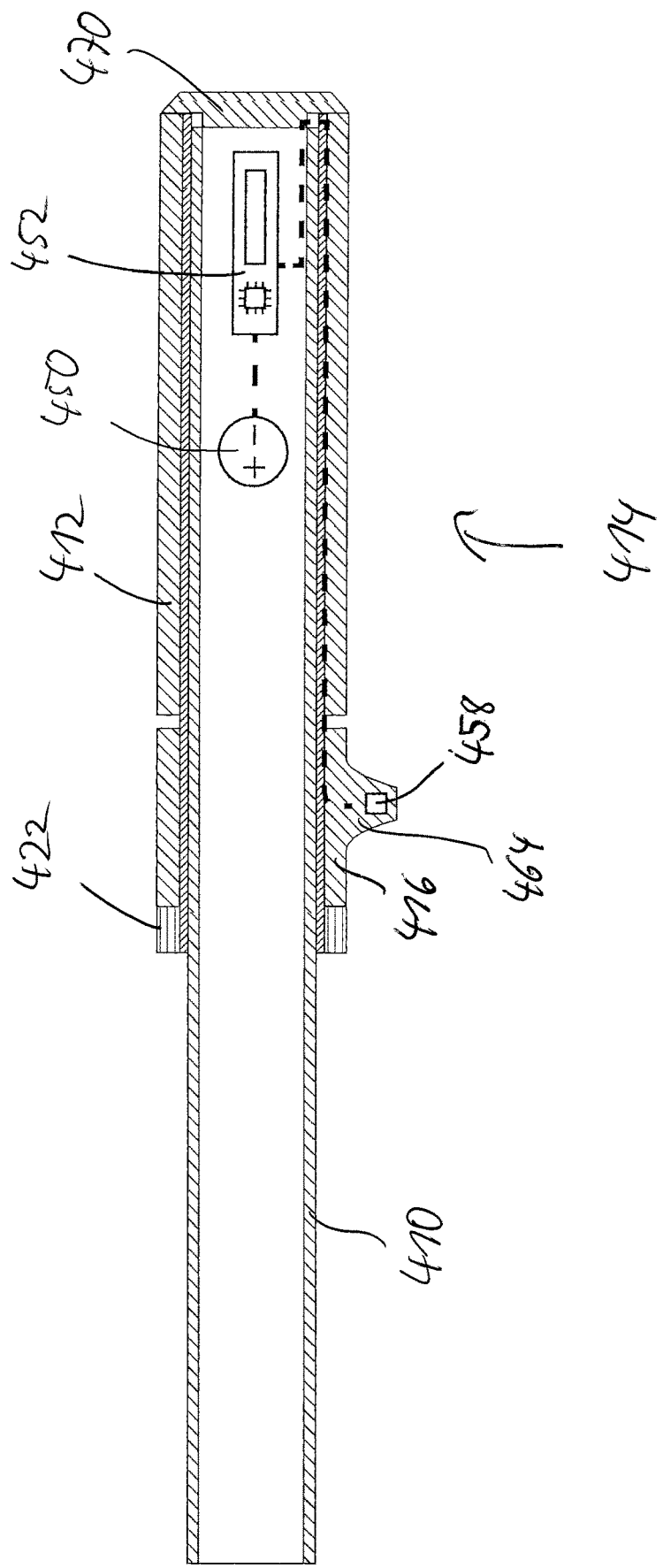
Figure 72:
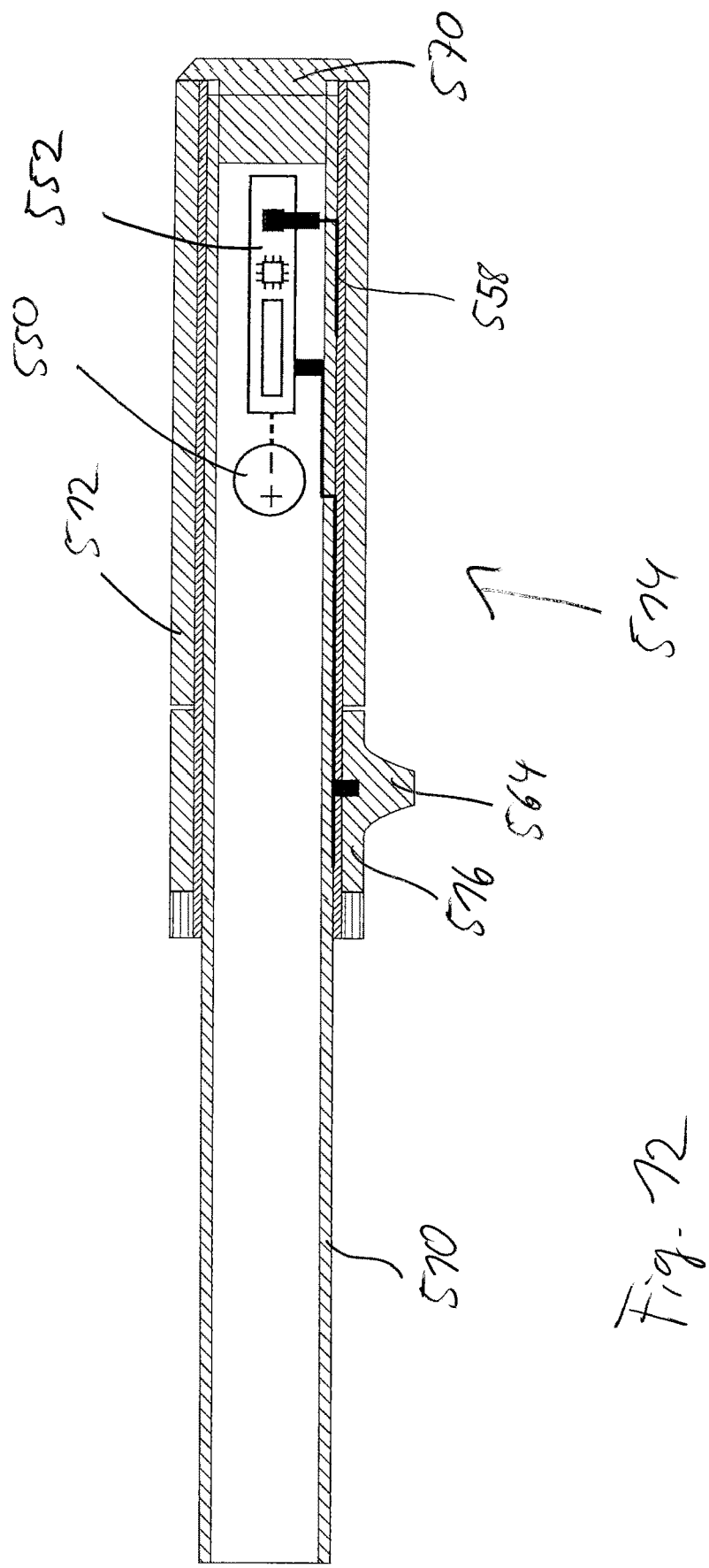

FIG. 11 shows a further example which moves in this direction. In this design variant, the antenna 458 is integrated into the electrical operator control arrangement 416. The connection line arrangement, illustrated in dashed lines, therefore connects both the antenna and signal transmitter elements of the electrical operator control arrangement to the electronics unit which is represented by the printed circuit board 452 and the energy source 450. This electrical connection arrangement is routed out of the handlebar tube end and routed through a guide of the grip element 414 to the operator control arrangement 416.

The electronic unit can, for its part, be an integral constituent part of a handlebar end cover.

According to FIG. 12, the connection lines are routed from the electronics unit, which is schematically represented by the printed circuit board 552 and the energy source 550, firstly to the operator control arrangement 516 and secondly to the antenna 558, which is arranged on an outer circumference of the handlebar, through a respective passage opening in the handlebar tube 510. The handlebar could be pre-equipped with connection elements of correspondingly integral design. In this variant too, it is expedient when the electronics unit is an integral constituent part of a handlebar end covering.

Figure 13:
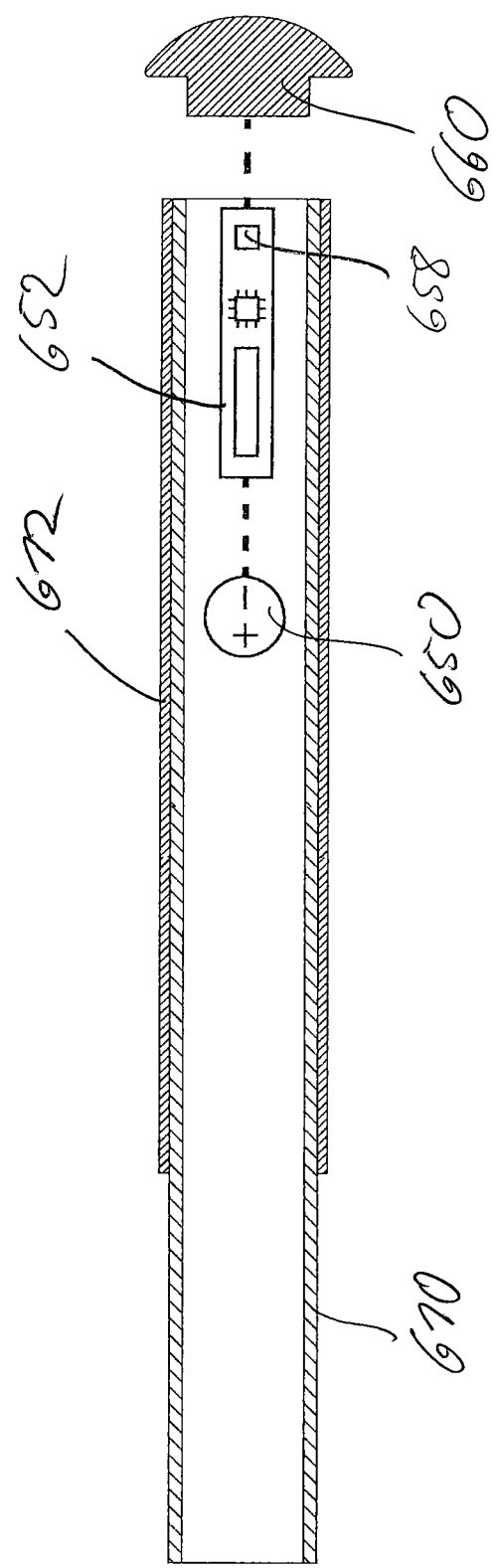

FIG. 13 schematically shows a design variant which moves in the direction of the solution according to FIG. 6, but with the electronics unit accommodated entirely in the interior of the handlebar and an associated separate operator control unit 660 at the handlebar end, with a direct connection to the electronics unit, for example in accordance with FIG. 6, or in connection with said electronics unit by means of a connection line arrangement. A solution of this kind is particularly expedient for a racing bracket or a triathlon handlebar. The handlebar can be designed with a radially open cut-out in accordance with the cutout 172 of FIG. 8 for improved radio wave coupling of the antenna 658. The operator control unit 660 should, as far as possible, be composed of a material which is permeable to radio waves, that is to say a suitable plastic for example.

A second exemplary embodiment of a control device according to an embodiment for a bicycle is illustrated in various views in FIGS. 14 to 17. As far as is expedient, the same reference symbols as in the preceding figures, increased by 100, will continue to be used for corresponding or analogous components in each case.

Figure 14:
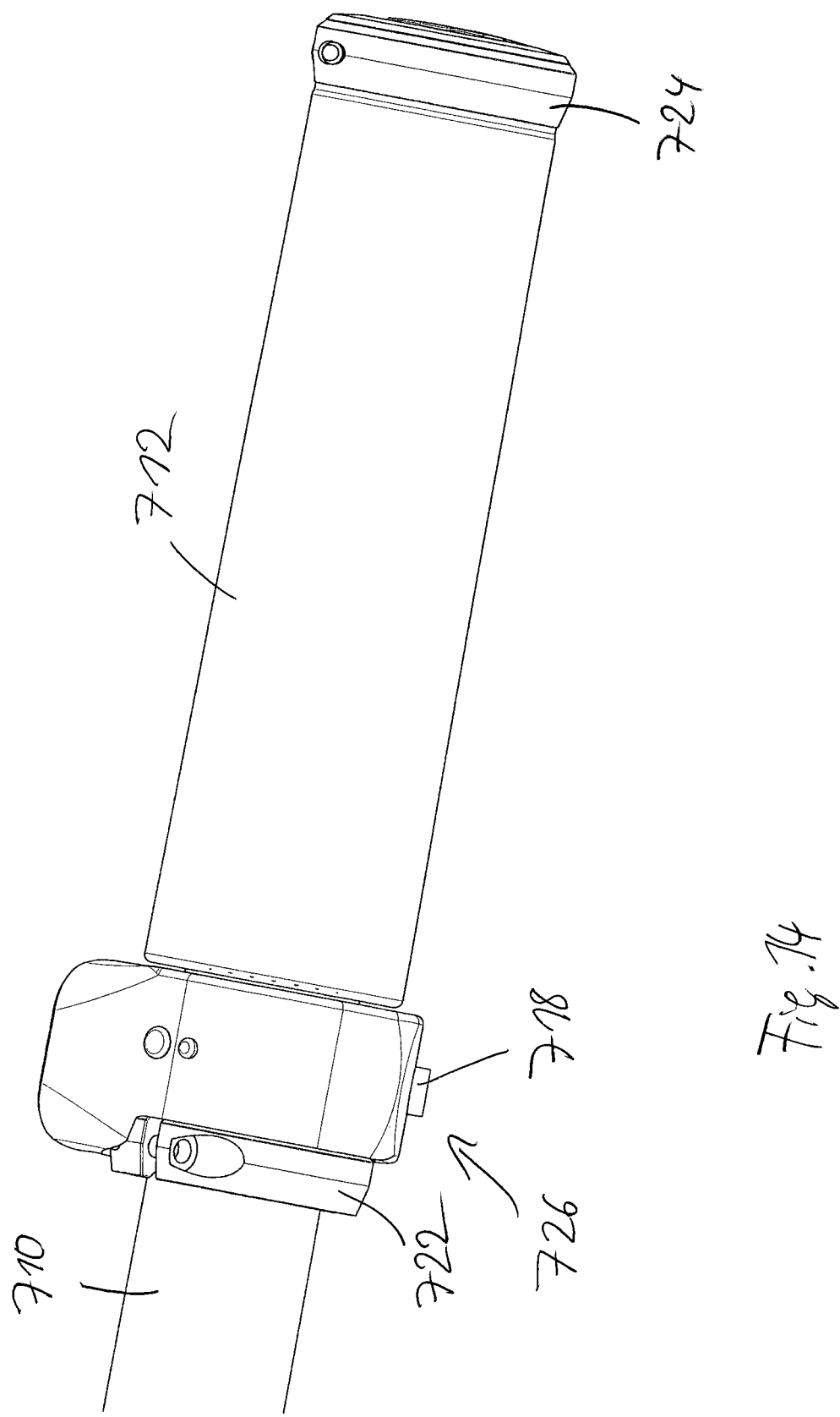
FIG. 14 shows a further example of a control device according to an embodiment which exhibits a unit which is arranged on the bicycle handlebar, surrounds the handlebar in an annular manner and has an integrated operator control lever.

The said figure shows a handlebar 710 which, according to FIG. 14, is equipped with a grip 712, in the present case with the right-hand side grip from the view of the cyclist riding the bicycle. A drive unit 726 which is designed as an integral unit and which fulfils both the functions of the electronics units of the preceding exemplary embodiments and the function of an electrical operator control arrangement, in the present case an electrical operator control lever arrangement, is provided separately from the grip 717 which is formed by a suitable grip unit or a suitable grip element.

Figure 15:
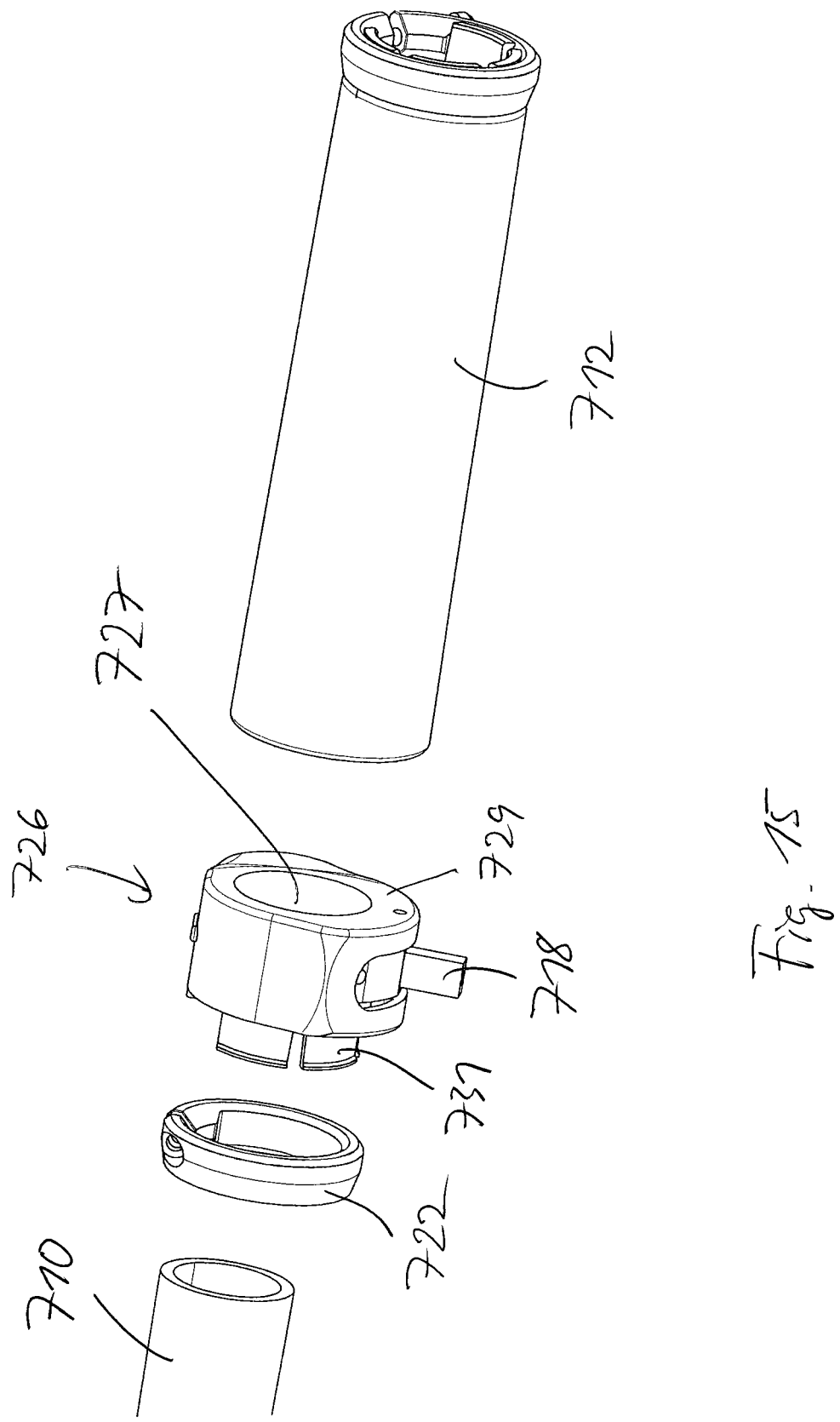
FIG. 15 shows an exploded view of the arrangement according to FIG. 14, with the handlebar, a clamping ring, the mentioned unit with an integrated operator control lever, and a separate grip element.

As shown more clearly in FIG. 15, the drive unit 726 is of annular or sleeve-like design, with a mounting passage opening 727 with which the drive unit 726 is mounted on the handlebar, so that components which are contained in an annular housing 729 of the drive unit extend around the outer circumference of the handlebar 710. A clamping ring 722, which firmly clamps the clamping tongues 731 of the drive unit 726 on the outer circumference of the handlebar 710, serves to secure the drive unit to the handlebar.

In the present exemplary embodiment, all relevant components of the control device are integrated into the drive unit 726, including the at least one antenna.

An operator control lever 718 is clearly shown in the figures. The operator control lever can be operated in the circumferential direction. However, the operator control lever could also be operable in another direction. A pushbutton arrangement for pushbutton operation comes into consideration as an alternative.

Figure 16:
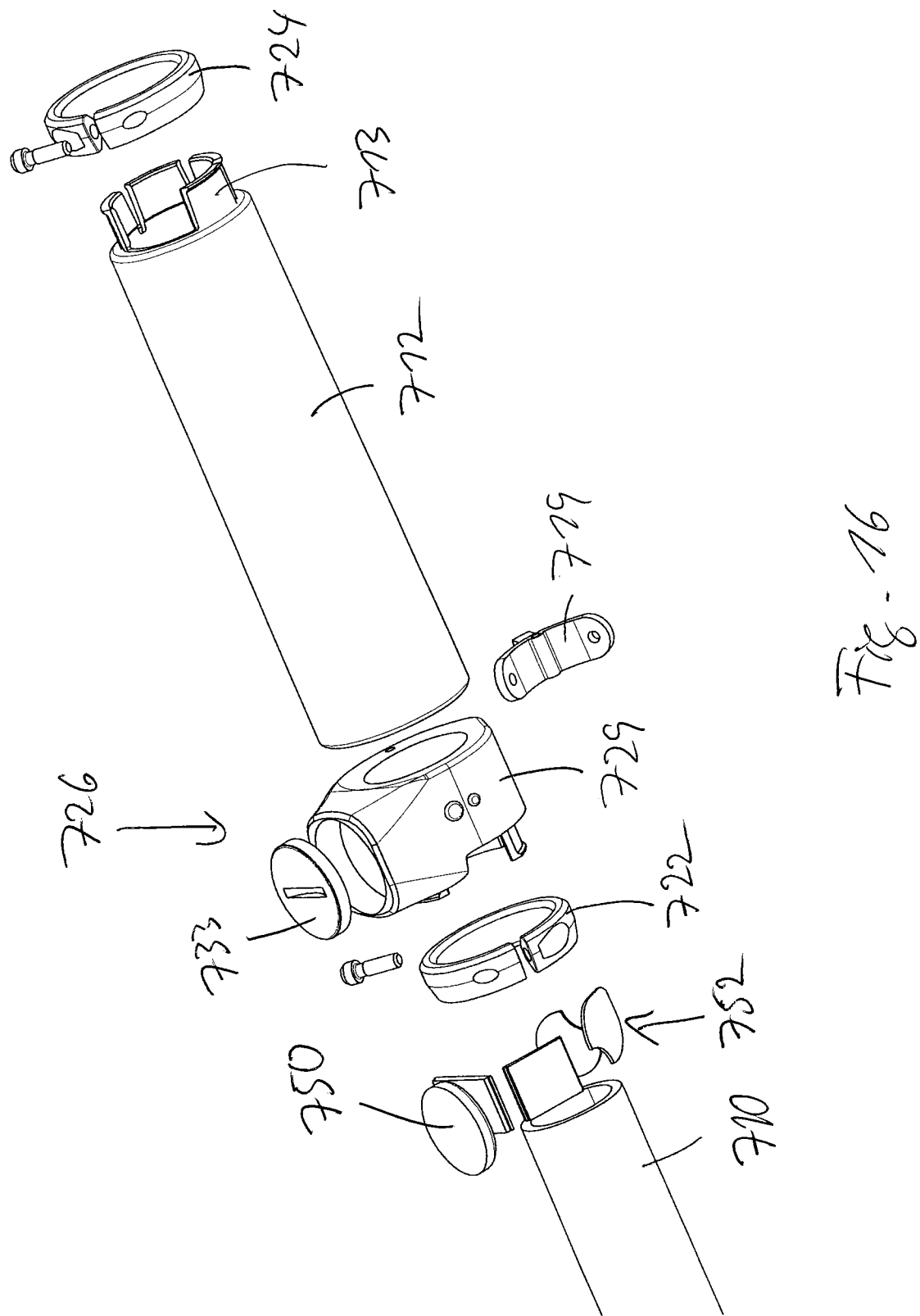
FIG. 16 shows the components of FIG. 15 in an exploded illustration in a state in which the components are highly simplified, from another viewing direction.

FIG. 16 shows an exploded view of the arrangement according to FIG. 14. The said figure also shows a further clamping ring 724 which serves to fasten the grip 712 by firmly clamping tongues 713 to the outer circumference of the handlebar 710. The clamping rings 722 and 724 each have an associated clamping screw which is illustrated separately, likewise in exploded form.

Various constituent parts of the drive unit 726 are illustrated separately in exploded form. In addition to the housing 729 and a battery compartment cover 733, the said figure also shows an operator control lever element 719, which provides the operator control lever 718, and also a battery 750 and a schematically illustrated printed circuit board arrangement 752. The said printed circuit board arrangement extends in the circumferential direction around the handlebar over a considerable circumferential angle and supports all of the necessary electronic components, including at least one antenna.

Figure 17:
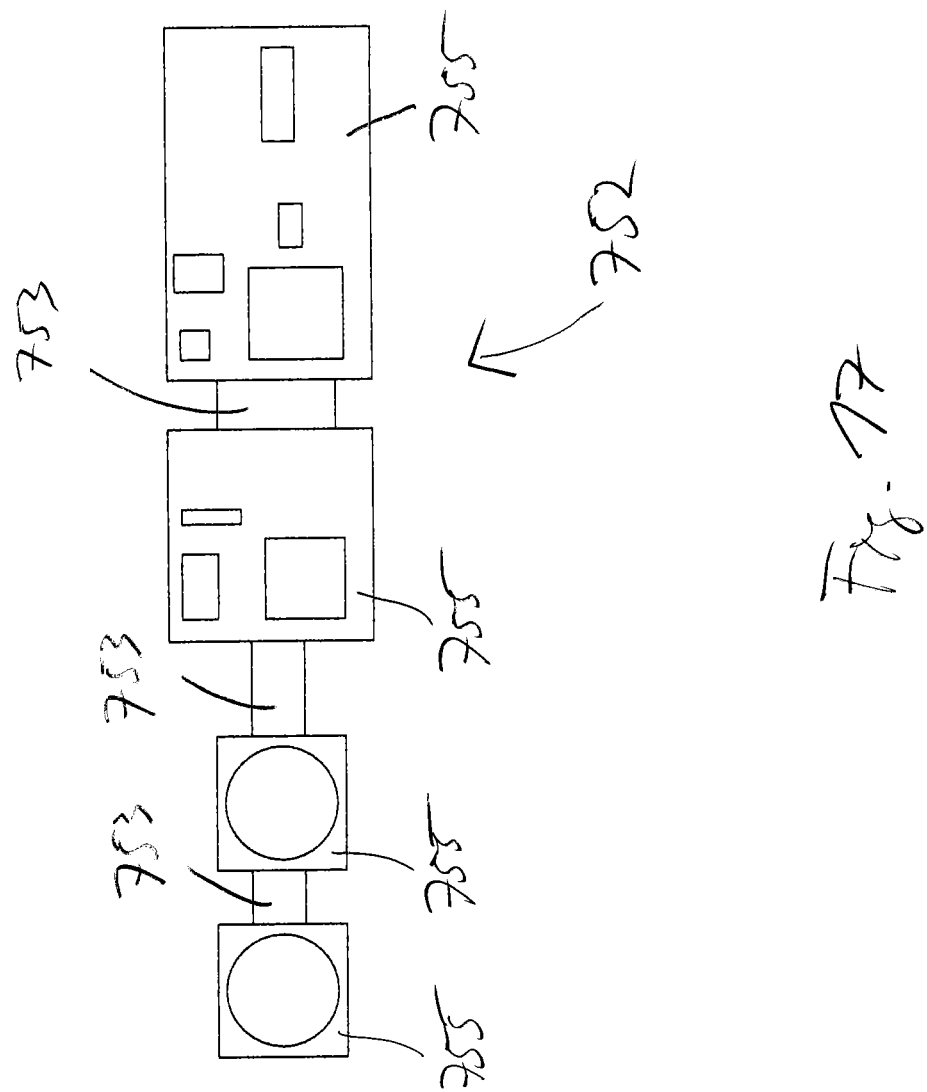
FIG. 17 schematically shows a printed circuit board arrangement of the unit which has the operator control lever.
Figure 79:
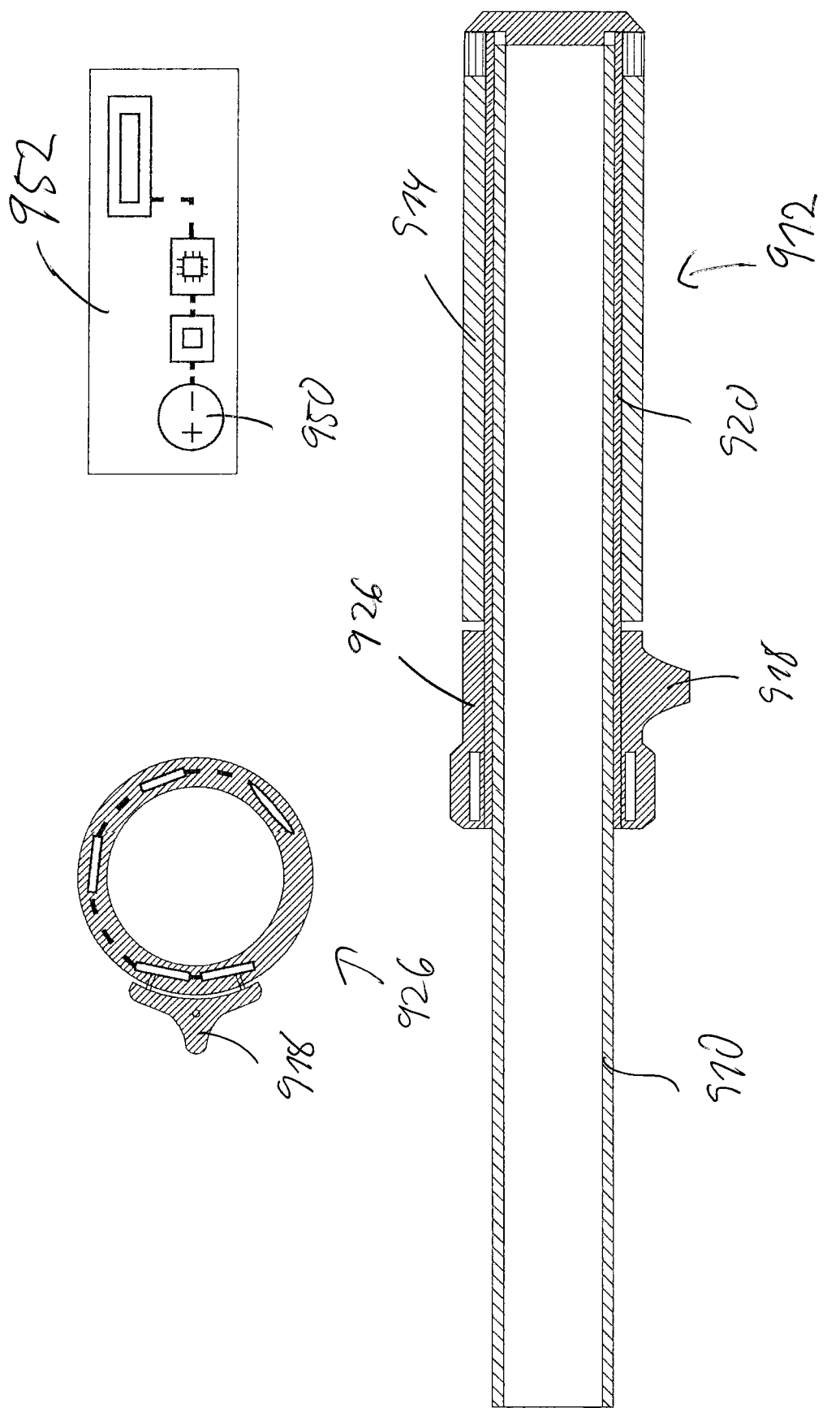

FIG. 17 shows a more specific illustrative representation of a suitable printed circuit board arrangement 752, comprising a plurality of printed circuit boards 755 which are connected to one another by means of flexible conductors 753. As an alternative, a printed circuit board which is flexible at least in regions or in full or a plurality of printed circuit boards which are flexible at least in regions or in full could be used, the said printed circuit boards extending around the outer circumference of the handlebar at least in regions in the state in which the drive unit is mounted on the handlebar.

A battery compartment cover 733 which closes a battery receptacle of the drive unit 726, which battery receptacle accommodates the battery 150 and is shown beneath the cover in the figure, is provided according to FIG. 16. As an alternative, the drive unit could be designed with an integrated rechargeable battery, with charging contacts on the outer circumference of the drive unit in order to be able to charge the integrated rechargeable battery as required. The rechargeable battery could also be easily coupleable to an associated housing section from the rest of the housing of the drive unit which remains on the handlebar, for separate charging at a different location and then be re-coupled to the housing section which has remained on the handlebar, so as to establish the necessary electrical connections.

FIGS. 18 to 22 schematically show further exemplary embodiments and design variants. The same reference symbols as in FIGS. 14 to 17 are used in each case, respectively increased by 100, and only the differences from the exemplary embodiment already described above or the exemplary embodiments already described above or the special features are explained in each case.

According to FIG. 18 too, the drive unit 826 is of annular design, with an electronic arrangement which extends around the outer circumference of the handlebar over a considerable circumferential angle in the mounted state and comprises a printed circuit board arrangement 852 which is flexible at least in regions and supports the required electronic components including at least one antenna and contacts for a battery 850. According to FIG. 18, the annular drive unit 826 is seated on a sleeve element 820 of the grip 812. The operator control lever 818 is located in the same axial region as the electronic circuit arrangement.

FIG. 19 corresponds to the arrangement according to FIG. 18. However, the electronic circuit arrangement and the integrated operator control lever arrangement comprising the operator control lever 918 (generally the integrated operator control arrangement) are axially offset in relation to one another in order to design the annular drive unit 926 to be radially particularly compact.

FIG. 20 shows a design variant in which the electronic circuit arrangement is not distributed around the outer circumference of the handlebar which supports the drive unit 1026, but rather is concentrated in a spatial region which is at a distance from the operator control element, predominantly the operator control lever 1018, in the circumferential direction.

As in the other embodiments according to FIGS. 14 to 20, the electronics and the antenna are arranged outside the handlebar in a drive unit which surrounds the handlebar in an annular manner according to FIG. 21 too.

The drive unit 1126 corresponds largely to the drive unit 826, but has smaller radial dimensions on account of a design of the handlebar tube 1110 with a section 1111 of smaller diameter on which the drive unit 1126 is arranged. A compact and/or ergonomic configuration of the drive unit is possible in this way. In order to mount or arrange the drive unit on the handlebar, the drive unit could have two housing sections which extend around the mounting opening, can be deflected for the purpose of increasing the size of the opening and can be fixed to one another in the mounted state, or two separate housing half-shells.

Figure 22:
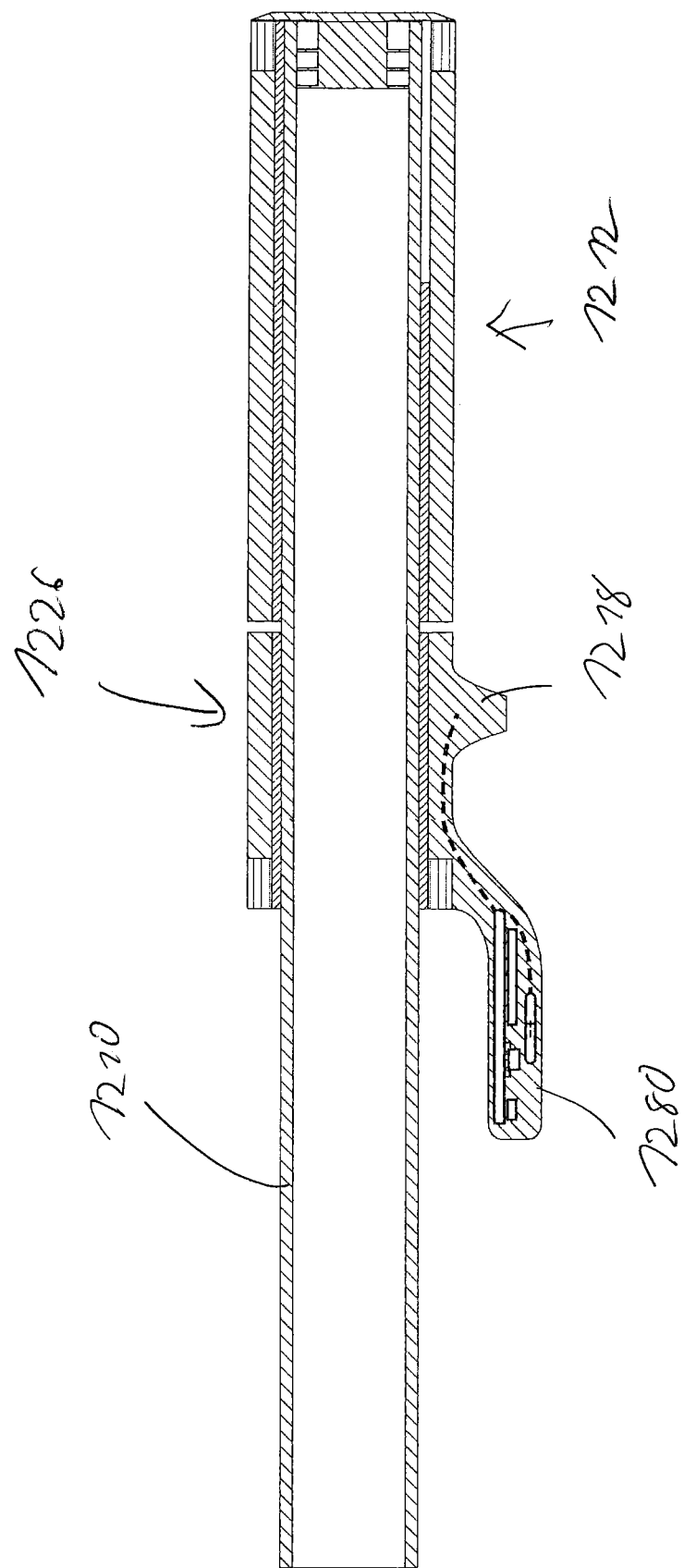

An annular drive unit 1226 which is likewise mounted on the handlebar 1110 is provided according to FIG. 22, the said drive unit being designed with the at least one operator control element, in the present case the at least one operator control lever 1218, and a housing projection 1280 which extends away from the ring section of the drive unit in an axial and radial manner and in which the electronic circuit arrangement comprising the antenna and the electrical power supply, in the present case a battery or battery arrangement, is arranged and is connected to the electrical operator control arrangement which is integrated in the ring section, in the present case the operator control lever arrangement 1218 by means of a line connection, illustrated in dashed lines.

Figure 23:
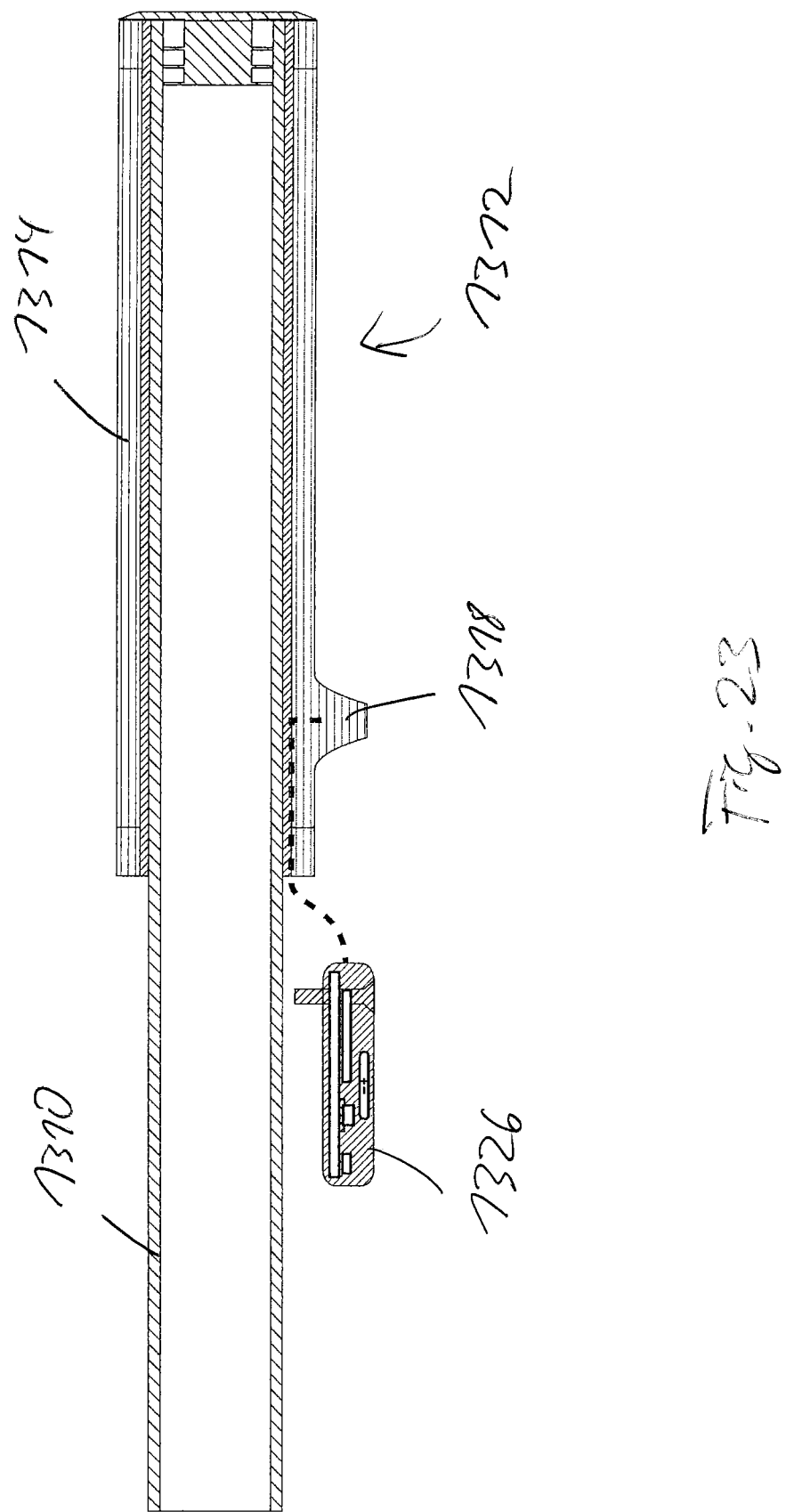

FIG. 23 illustrates an alternative refinement in which, instead of a housing projection to a ring section of the drive unit, a drive unit 1326 which is arranged separately from the operator control arrangement, possibly operator control lever arrangement 1316, and can be fastened to the handlebar is provided, the said drive unit containing all of the components and constituent parts of the electronic drive arrangement, including battery and antenna, apart from the operator control arrangement 1316 which is connected by means of a line connection, illustrated in dashed lines, and can be designed as a ring unit which is separate from the grip and is mounted on the handlebar (if desired similarly to FIG. 22) or can be integrated into the grip 1312 or the grip unit 1314 of said grip, as is illustrated in FIG. 23.

Figure 24:
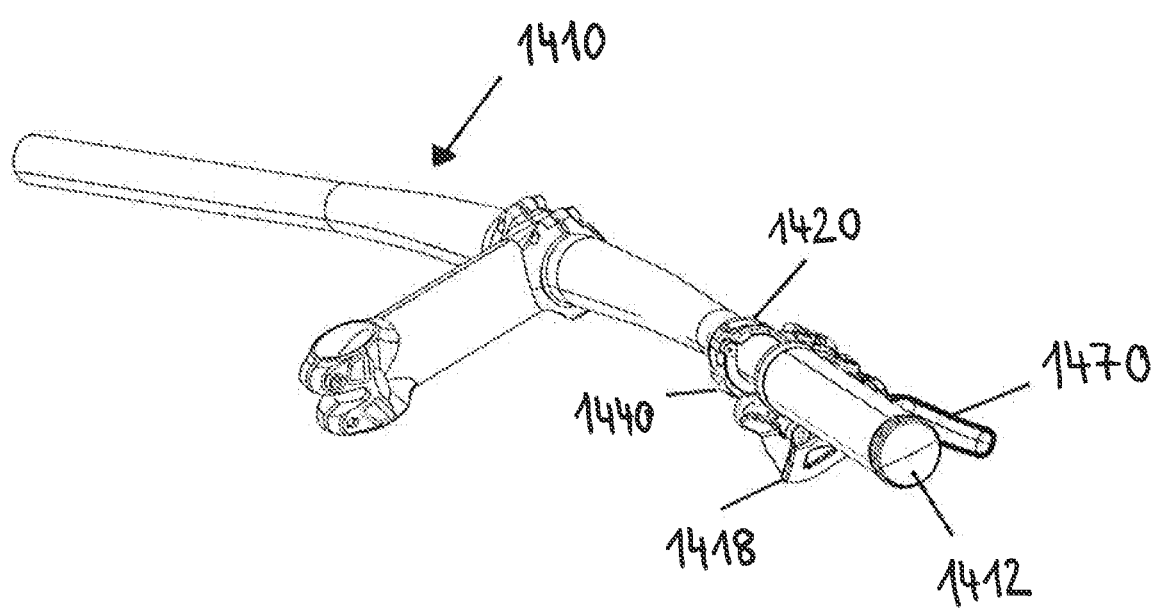
FIG. 24 shows a further embodiment of the control device according to an embodiment, which is mounted together with a brake lever by means of a clamp and an adapter to the bicycle handlebar.
Figure 25A:
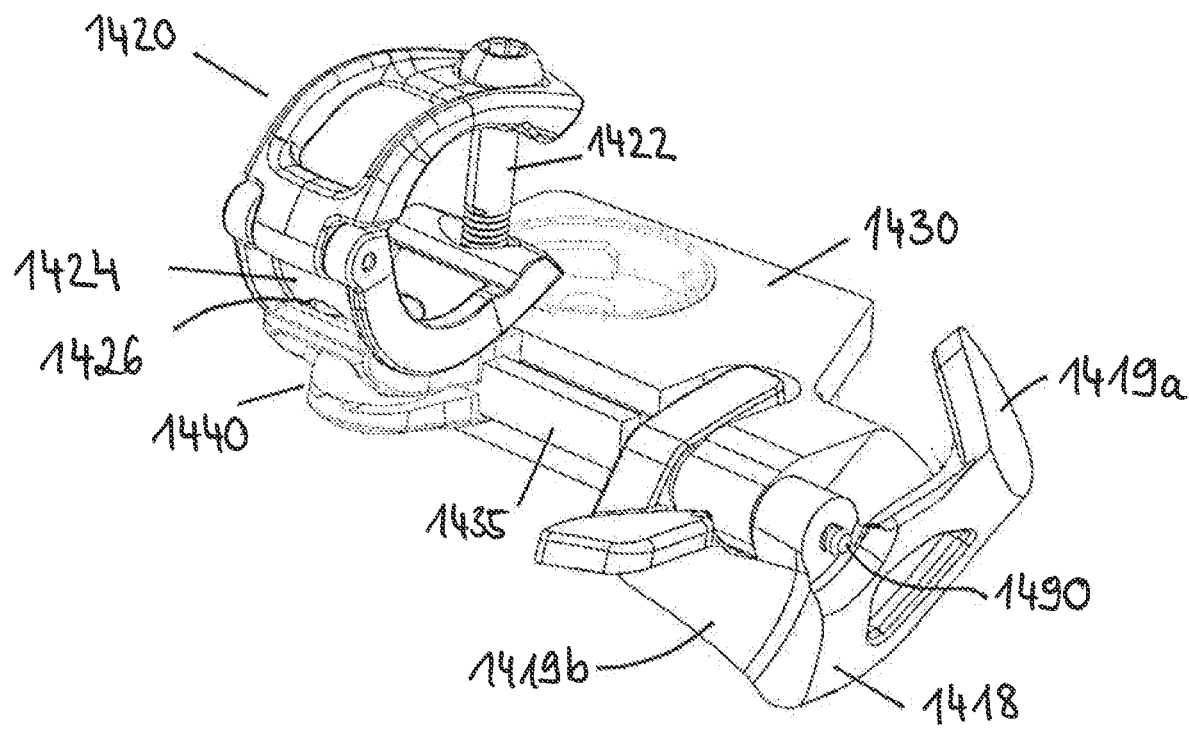
FIG. 25a shows the control device of FIG. 24 with the clamp and the adapter in a state not mounted to the handlebar.
Figure 25B:
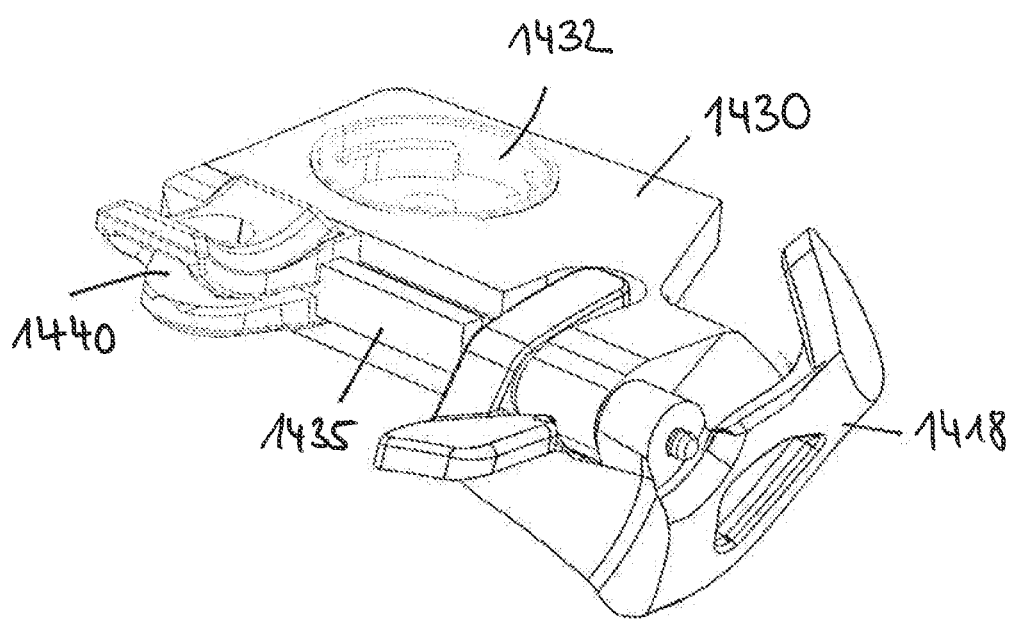
FIG. 25b shows the control device of FIG. 25a without the clamp.
Figure 25C:
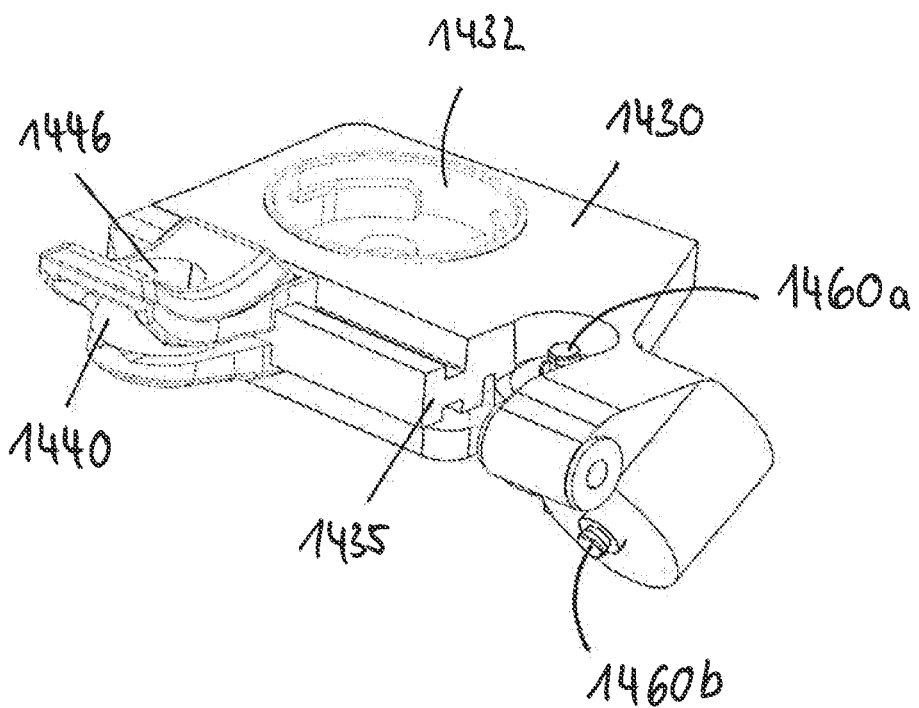
FIG. 25c shows the control device of FIG. 25b without the operating element.
Figure 25D:
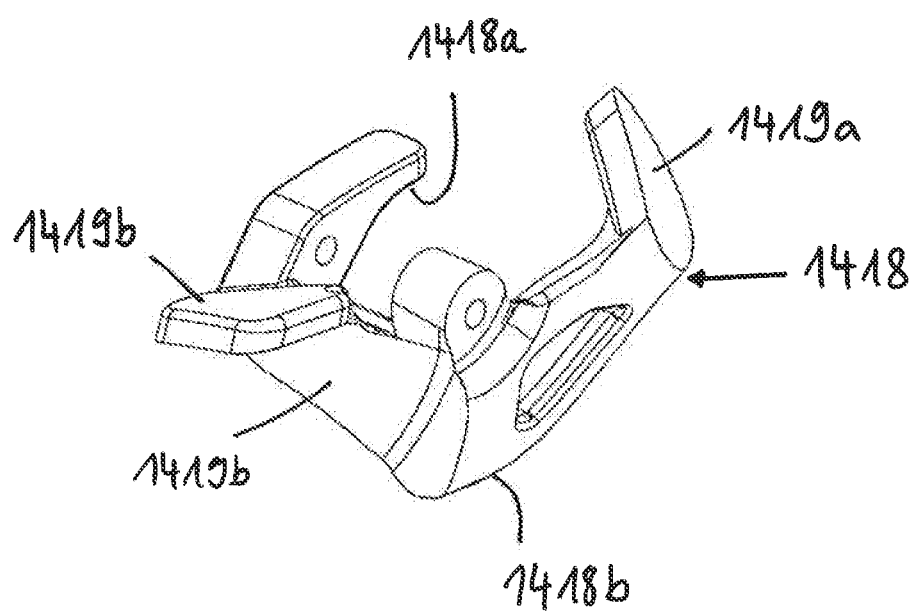
FIG. 25d shows the operating element of the control device only.
Figure 26:
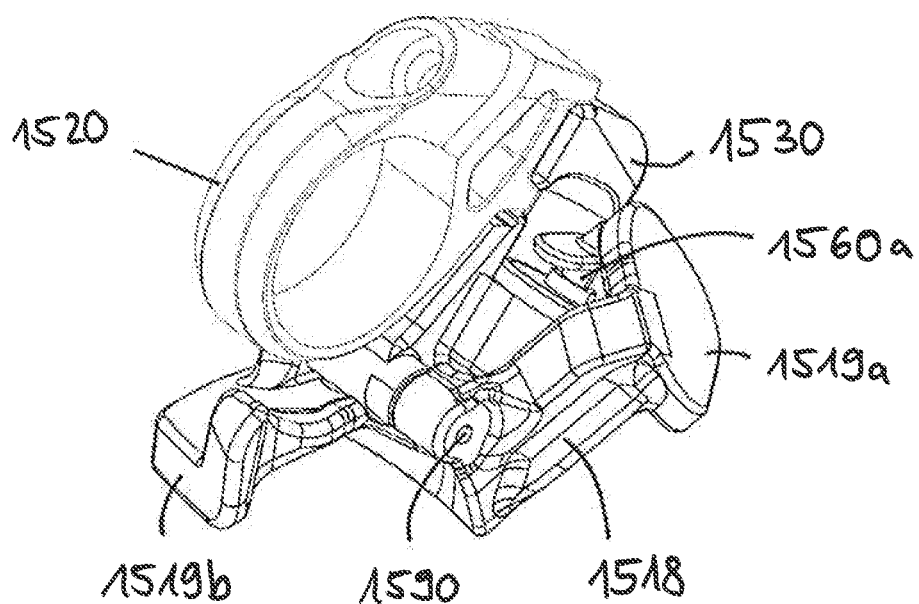
FIG. 26 shows another embodiment of the control device according to an embodiment with an alternative clamp design for mounting on the handlebar.

FIGS. 24, 25 and 26 show two further examples of the control devices according to an embodiment. Both control devices also fulfil the functions of the electronic units as well as the functional principle of the electrical operator control arrangement of the preceding embodiments.

The control devices shown include a manually operable operating element 1418, 1518 and an electronic circuit arrangement arranged in a housing 1430, 1530 and thus not visible here. The electronic circuit arrangement has already been described in detail in connection with the previous examples. The operating element 1418, 1518 is rotatably mounted on the housing 1430, 1530. The housing 1430, 1530 receives the electronic circuit arrangement and is arranged externally on the handlebar.

The embodiments shown in FIGS. 24, 25 and 26 of the control device differ mainly in view of their attachment to the handlebar, which will be discussed later. The functional principle of the control devices is the same for both embodiments and will therefore be described only by way of one embodiment with reference to the FIGS. 24 and 25.

FIG. 24 shows the control device in a state mounted to the bicycle handlebar 1410. The control device is located in the direction of travel on the right side of the bicycle handlebar 1410 in the vicinity of the handle 1412. With the manually operable operating element 1418 of the operating arrangement an electromechanical rear derailleur (not shown) is controlled wirelessly. Depending on the direction of movement of the operating element 1418 shifting into a higher or lower gear is performed. In the example shown only one operating arrangement to control the rear derailleur is necessary. Modern bicycle drives often comprise a single front chainring and a rear multi-sprocket assembly with a large number of sprockets. A single chainring in combination with a multi-sprocket assembly with ten, eleven or twelve sprockets covers a wide range of gear ratio and has proven itself. Also, a further increased number of thirteen or fourteen sprockets would be conceivable. Due to the single chainring no front derailleur is necessary and therefore no further operating arrangement.

Of course, an additional control device controlling an electromechanical front derailleur or another bicycle component could be placed at to the still free left handlebar if required. The additional control device would follow the same principles.

The functional principle of the control device will now be explained with reference to FIGS. 24 and 25*a* to *c* more accurately. The operating element 1418 is moved by the thumb and/or finger. The movement is a rotational movement of the operating element 1418 about a rotational axis 1490. The operating element 1418 rotates about the rotational axis 1490 relative to the stationary housing 1430. The operating element 1418 is rotated from its neutral position in a first direction of movement clockwise about the rotation axis 1490 as the driver applies pressure to the first contact surface 1419*a* of the operating element 1418. Accordingly, the operating element 1418 is rotated in a second direction counter clockwise about the rotation axis 1490 as the driver applies pressure to the second contact surface 1419*b*. The operating element 1418 is formed so that there are multiple options for the driver to move the operating element 1418. The contact surfaces 1419 are formed on projections and/or indentations. Pressure can be applied to either the front or back sides of such a projection and results in a movement in a first or second direction of movement.

The housing 1430 comprises two housing halves and receives both the electronic circuit arrangement, including the antenna and the battery. Of course, the housing can also consist of more than two parts. The battery compartment 1432 for a replaceable battery is a sealed with a battery compartment cover (battery and battery compartment cover are not shown). The battery powers the electronic circuit arrangement with electric energy. The housing 1430 also includes retainers for the two electrical contact switches 1460. The electrical contact switches 1460 are received in the housing 1430, so that on the one side they can be activated by switch contact surfaces 1418*a, b* of the operating element 1418, and on the other side they are connected with the electronic circuit arrangement inside the housing 1430. One end of the electrical contact switch 1460 faces the operating element 1418 and the other end of the electrical contact switch 1460 faces the electronic circuit arrangement.

It is conceivable to make the operating element 1418 replicable so that it can be ergonomically adapted to the needs of the driver. The driver could then select from a variety of differently designed control elements with regard to shape, size, material and/or surface texture. A releasable coupling of the operating element to the housing by means of the rotation axis would be easy to implement.

By moving the operating element 1418 from its neutral position a first or second electrical contact switch 1460*a, b* is activated and as a result a control command is sent from the control device to the component to be controlled, which is the rear derailleur. The electrical contact switches 1460 are conductively connected to the electronic circuit arrangement, which is arranged within the housing. In the first direction of movement (clockwise) of the operating element 1418, a first electrical contact switch 1460*a* is activated by a first switch operating surface 1418*a* on the back side of the operating element 1418, which presses the first electrical contact switch 1460*a*. In response thereto, a first signal is generated and sent to the rear derailleur to be controlled for shifting in the next lower gear. In a second movement direction of the operating element 1418 (counter clockwise), a second electrical contact switch 1460*b* is activated by a second switch actuating surface 1418*b* on the back side of the operating element 1418, which presses the second electrical contact switch 1460*b*. In response, a second signal is generated and sent to the rear derailleur for shifting to the next higher gear. If the operating element 1418 is held in the active position, more than one gear steps are shifted successively.

The arrangement of the operating element 1418 and its interaction with the electrical contact switches 1460 can best be seen in FIGS. 25*a* to 25*c*. For a better understanding FIG. 25*c* shows the control device without the operating element 1418 so that the electrical contact switches 1460 are visible.

The two electrical contact switches 1460 are spring loaded and push the operating element 1418 back into its neutral position. Upon actuation the electrical contact switch itself generates a haptic feedback and transmits it to the operating member. The electrical contact switches 1460 are designed as snap-action switches. A snap-action switch is advantageous because it produces both, the electrical contact and the haptic feedback. Other components are not necessary. In addition, the force-displacement characteristics of the snap-action switch can be adapted to allow the activation by means of the driver's thumb or forefinger, and still to generate sufficient haptic feedback. In the illustrated example, two electrical contact switches with different properties are used. The first electrical contact switch 1460*a* comprises a weaker spring element as the second electrical contact switch 1460*b*. This means the driver must exert less force in one direction of movement of the operating element 1418 for shifting than in the other direction of movement. Typically, the first contact surface 1419*a* is operated with the index finger and the second contact surface 1419*b* with the thumb. With the thumb pressure can be applied more easily than with the index finger. To create a similar shift feel the second contact surface 1419*b* (thumb) interacts with the second electrical contact switch 1460*b*, having a stronger spring element than the first electrical contact switch 1460*a*. This can also be seen by the different sizes of the two electrical contact switches 1460. The snap-action switch is compact enough to be comfortably operated and takes little space.

Alternatively, a snap disc (snap dome) can be used as an electrical contact switch.

The electronic circuit arrangement is accommodated together with the antenna in the housing 1430 which is held on the outer circumference of the handlebar 1410. The housing 1430 is fixed to the handlebar 1410 by means of an annularly surrounding fastening device. The fastening device is designed as a separate clamp 1420. Alternatively, the fastener could be formed as an integral portion of the housing (see FIG. 14).

FIG. 24 shows the control device assembled on the handlebar 1410. The control device is secured to the handlebar 1410 by a clamp 1420 or a clamping ring. The clamp 1420 or the clamping ring encompasses the handlebar 1410 and can be mounted to it in a torque proof manner. The clamp 1420 allows both a translatory positioning along the handlebar axis, and a rotational alignment with respect to the brake lever. The control devise and the brake lever are positioned to each other so that a collision-free and ergonomic handling is possible.

Similarly as in the embodiments in FIGS. 14 to 23 in this embodiment, all components are arranged outside of the handlebar 1410. The control device forms a unit which is located outside of the handlebar 1410 making it easily accessible and easy to install. An arrangement outside of the handlebar has the advantage that (radio) signals to be transmitted are easily transferable. Nevertheless, the arrangement of the electronic circuit arrangement in the housing 1430 provides enough protection from dirt and moisture.

The electronic circuit arrangement comprises a circuit board assembly. The antenna is arranged as a module on the circuit board assembly. For the best possible transmission, the antenna including the housing 1430 is oriented so that the signal as far as possible can be transmitted to the controlled bicycle component without obstacles. In order not to disturb the transmission of the radio signals, the housing 1430 is formed from a non-metallic material. In the embodiment shown, an electromechanical rear derailleur arranged on a rear wheel, so that the housing is arranged to point to the rear and downward seen in the direction of travel of the bicycle. For example the antenna may be oriented skew to the handlebar axis.

What was said above in relation to FIGS. 24 and 25 is equally applicable to the embodiment shown in FIG. 26. The two embodiments differ mainly in the nature of their attachments to the handlebar.

In the embodiment shown in FIGS. 24 and 25, the clamp 1420, which the control device on the handlebar 1410 holds simultaneously responsible for attachment of the brake lever 1470th FIG. 24 shows the control device with the brake lever 1470 next to the handle 1412 to the handlebar mounted 1410.

The bracket or clamp 1420 is fixed by means of a clamping screw 1422 on the handlebar 1410. The control device and the brake lever 1470 can be positioned and fixed in the circumferential and/or longitudinal direction of the handlebar 1410 by means of the clamp 1420. Between the clamp 1420 and the housing 1430 of the control device, an adapter 1440 is arranged. The control device can be moved and positioned in the circumferential direction of the handlebar 1410 by means of the adapter 1440 along a guide 1424 on the clamp 1420. The adapter 1440 is then fixed in the desired position on the clamp 1420—for example with a screw to be inserted in an opening 1446 in the adapter 1440 and mounted in a slot 1426 in the guide 1424 of the clamp 1420. Adjustability of the control device in the circumferential direction in an angular range of about 20 degrees about the longitudinal axis of handlebar is sufficient.

The control device can thus be positioned in addition to and independent of the position of the brake lever 1470 along the guide 1424 of the clamp 1420 in the circumferential direction of the handlebar 1410. In addition to the adjustment in the circumferential direction of the handlebar 1410 this adapter solution also allows a linear adjustment substantially along the longitudinal axis of the handlebar. A linear displacement of about 10 mm to 20 mm allows adaptation to the ergonomics of most riders. For the linear adjustment the housing 1430 comprises a projection 1435. The adapter 1440 has two arms which engage around the projection 1435. The arms of the adapter 1440 can be set by clamping the projection 1435. Ideally, with the same screw that establishes the circumferentially fixation through the opening 1446 in the adapter 1440. This version allows the housing 1430 to move continuously linear with respect to the adapter 1440, and to the clamp 1420.

Alternatively, a stepwise linear adjustment could be realized through a number of holes or a ratchet in the projection of the housing.

Thus, in the embodiment of FIGS. 24 and 25 positioning of the control device in the circumferential and/or longitudinal direction of the arm of the handlebar 1410 is possible.

With the clamp 1420 at the same time the brake lever 1470 is attached to the handlebar 1410. The positioning of the control device and the brake lever 1470 are possible independent of each other due to the adapter 1440.

Alternatively, the adapter solution with linear and circumferential positioning of the control device relative to the clamp would be conceivable, even without a brake lever attached to the clamp.

Even a mere linear displacement of the control device relative to the clamp would be possible.

Alternatively, two separate mounts can be provided. For example, a clamp for attaching the brake lever and a further clamp for attaching the control device.

FIG. 26 shows a further embodiment of the control device, which is mountable by means of a clamp 1520 on the handlebar. This clamp 1520 is fixed to the housing 1530 and does not allow adjustment of the control device relative to the clamp 1520 in linear and/or circumferential direction of the handlebar. However, the clamp 1520 allows for a positioning of the control device in the circumferential direction and along the handlebar axis when the clamp 1520 itself is moved along the handlebar or rotated about it. The clamp 1520 shown is not designed for the attachment of a brake lever. The brake lever may have to be mounted and positioned separately from the clamp 1520 to the handlebar.

Alternatively, the clamp could comprise a crank in a region in which the housing of the control device is attached to the clamp. The crank of the clamp extends either in the direction of the middle of the handlebar or towards the handle. With such an offset, the control devise is attached offset relative to the clamp. For example, a crank of the clamp towards the handle moves the control device closer to the handle, making it more accessible for the rider, without having to move the clamp towards the handle. So there may be a certain distance to be bridged, without having to move the clamp linear along the handlebar. This is especially important when there is little space or collision of the clamp occurs with other components on the handlebar.

Alternatively, a linear displacement of the control device relative to the clamp would be conceivable, with a housing having a projection which can be engaged in a guide on the clamp and moved relative to it. This would enable a quick adjustment to the ergonomics of the rider, without having to loosen the clamp.

Alternatively, the clamp and the housing, or at least a part of the housing may be integrally formed. Thus, very few components are necessary and the assembly costs would be low.

The functional principle of the control device otherwise corresponds to the variant shown in FIGS. 24 and 25. The housing 1530 includes the electronic and the battery and also receives the electrical contact switches 1560. The operating element 1518 is rotatable about the axis of rotation 1590 of the housing 1530. By pushing one of the two contact surfaces 1519a, 1519b of the operating member 1518, the operating member 1518 interacts with one of the two electrical contact switches 1560 and sends a control command to the component to be controlled.

While the present invention has been described above by reference to various embodiments, it should be understood that many changes and modifications can be made to the described embodiments. It is therefore intended that the foregoing description be regarded as illustrative rather than limiting, and that it be understood that all equivalents and/or combinations of embodiments are intended to be included in this description.

The invention claimed is:

1. A control device for a bicycle, the control device configured to be arranged on a handlebar of the bicycle, comprising:
   a clamp;
   a fastener configured to secure the clamp around the handlebar, the handlebar having a central axis;
   a housing made of a non-metal material secured to the clamp, the housing having at least one projection, the at least one projection having at least one hole for receiving a shaft, the shaft defining a pivot axis;
   an electronic circuit within the housing;
   a first switch and a second switch, the first switch and the second switch connected to the electronic circuit; and
   a first contact surface and a second contact surface rotatably mounted to the housing, the first contact surface and second contact surface pivoting about the pivot axis, the first contact surface is configured to actuate the first switch, the second contact surface is configured to actuate the second switch,
   wherein the pivot axis is configured to be non-intersectant of the central axis of the handlebar.

2. The control device of claim 1, wherein the electronic circuit includes an antenna.

3. The control device of claim 1, wherein the electronic circuit includes a power source.

4. The control device of claim 1, wherein the first contact surface is rotated in a first direction about the pivot axis to activate the first switch.

5. The control device of claim 4, wherein the second contact surface is rotated in a second direction about the pivot axis to activate the second switch.

6. The control device of claim 5, wherein activation of the first switch sends a first signal to a bicycle component and actuation of the second switch sends a second signal to the bicycle component, the first signal and the second signal being different from each other.

7. The control device of claim 1, wherein the housing is a two-part housing.

8. The control device of claim 1, wherein the first contact switch and the second contact switch include a spring element, the spring element configured to keep the first contact surface and the second contact surface in a neutral position until actuation by a user.

9. A control device for a bicycle, the control device configured to be arranged on a handlebar of the bicycle, comprising:
   a clamp;
   a housing at least partially annular in shape, the clamp configured to secure the housing to the handlebar, the handlebar having a central axis;
   a circuit board located within the housing in an axial region, the circuit board configured to extend tangential to an outer circumference of the handlebar; and
   an operator control feature connected to the housing, the operator control feature configured to operate in two different directions about a pivot axis,
   wherein the operator control feature is also located in the axial region, radially further away from the central axis than the circuit board.

10. The control device of claim 9, wherein the pivot axis is radially further away from the central axis than the circuit board.

11. The control device of claim 9, wherein the circuit board includes an antenna.

12. The control device off claim 9, wherein the circuit board includes a power source.

13. The control device of claim 9, wherein the operator control feature includes at least one contact surface that is rotated in a first direction about the pivot axis to activate a switch.

14. The control device of claim 9, wherein the operator control feature is at least one of a pushbutton or a lever.

15. The control device of claim 9, further comprising:
a fastener configured to aid in securing the clamp around the handlebar.

16. The control device of claim 9, wherein the housing includes a mounting opening.

\* \* \* \* \*